(12) United States Patent
Suzuki et al.

(10) Patent No.: US 8,407,507 B2
(45) Date of Patent: Mar. 26, 2013

(54) POWER MANAGEMENT CIRCUIT, POWER MANAGEMENT METHOD AND POWER MANAGEMENT PROGRAM FOR CONTROLLING POWER SUPPLIED TO FUNCTIONAL BLOCKS IN INTEGRATED CIRCUITS

(75) Inventors: Takahisa Suzuki, Kawasaki (JP); Hideo Miyake, Yokohama (JP)

(73) Assignees: Fujitsu Limited, Kawasaki (JP); Fujitsu Semiconductor Limited, Yokohama (JP)

( * ) Notice: Subject to any disclaimer, the term of this patent is extended or adjusted under 35 U.S.C. 154(b) by 151 days.

(21) Appl. No.: 12/795,402

(22) Filed: Jun. 7, 2010

(65) Prior Publication Data

US 2010/0313041 A1    Dec. 9, 2010

(30) Foreign Application Priority Data

Jun. 8, 2009  (JP) ................................. 2009-137658

(51) Int. Cl.
*G06F 1/00*    (2006.01)
*G06F 1/26*    (2006.01)
(52) U.S. Cl. ........................................ 713/330; 713/324
(58) Field of Classification Search ........... 713/300–340
See application file for complete search history.

(56) References Cited

U.S. PATENT DOCUMENTS

| | | | |
|---|---|---|---|
| 5,928,365 A | 7/1999 | Yoshida | |
| 6,625,740 B1* | 9/2003 | Datar et al. | 713/324 |
| 7,484,111 B2* | 1/2009 | Fung | 713/320 |
| 7,721,125 B2* | 5/2010 | Fung | 713/320 |
| 7,853,808 B2* | 12/2010 | Kim et al. | 713/300 |
| 7,882,379 B2* | 2/2011 | Kanakogi | 713/322 |
| 2004/0215987 A1* | 10/2004 | Farkas et al. | 713/300 |
| 2005/0055592 A1* | 3/2005 | Velasco et al. | 713/322 |
| 2006/0026447 A1* | 2/2006 | Naveh et al. | 713/322 |
| 2007/0220293 A1* | 9/2007 | Takase | 713/320 |
| 2008/0244294 A1* | 10/2008 | Allarey | 713/324 |
| 2009/0204837 A1* | 8/2009 | Raval et al. | 713/330 |
| 2011/0022865 A1* | 1/2011 | Gunther et al. | 713/322 |
| 2011/0213998 A1* | 9/2011 | Mathieson et al. | 713/324 |

FOREIGN PATENT DOCUMENTS

| | | |
|---|---|---|
| JP | 09-212416 A | 8/1997 |
| JP | 2005-196545 A | 7/2005 |

\* cited by examiner

*Primary Examiner* — Raymond Phan
(74) *Attorney, Agent, or Firm* — Arent Fox LLP

(57) ABSTRACT

A power management circuit has a resource management unit which performs a use management of a functional block in an integrated circuit, and a power management unit which transmits a power control request to a power control device which controls power of the functional block for each domain. The power control request designates the domain and the power control content for the domain. The power management unit executes a use prohibition process prohibiting the use of the functional block belonging to the domain, by using the resource management unit, before transmitting the power control request to the power control device, in accordance with a type of the functional block belonging to the domain and the power control content.

11 Claims, 17 Drawing Sheets

FIG. 2

| DOMAIN | FEASIBLE OPERATION | FUNCTIONAL BLOCK BELONGING TO DOMAIN |
|---|---|---|
| DOMAIN 0 | CHANGE CLOCK SIGNAL OR SUPPLY VOLTAGE | CPU 10<br>CPU 11<br>MEMORY 21<br>MEMORY 22<br>DMAC 31<br>ACC 32<br>DSP 33 |
| DOMAIN 1 | STOP (OR RESTART) SUPPLY OF CLOCK SIGNAL OR SUPPLY POWER | CPU 11<br>MEMORY 22<br>DSP 33 |
| DOMAIN 2 | STOP (OR RESTART) SUPPLY OF CLOCK SIGNAL OR SUPPLY POWER | ACC 32 |

FIG. 4

| CONTROL TYPE | CONTROL PROCESS |
|---|---|
| PATTERN 1 | AFTER USE PROHIBITION PROCESS IS EXECUTED, POWER CONTROL IS EXECUTED. AFTER POWER CONTROL IS EXECUTED, USE PERMISSION PROCESS IS EXECUTED. |
| PATTERN 2−1 | AFTER USE PROHIBITION PROCESS IS EXECUTED, POWER CONTROL IS EXECUTED. |
| PATTERN 2−2 | AFTER POWER CONTROL IS EXECUTED, USE PERMISSION PROCESS IS EXECUTED. |

FIG. 6

| EXAMPLE OF FUNCTIONAL BLOCK | POWER CONTROL CONTENT / CONTROL TYPE / BUS ACCESS CONTROL TYPE | CHANGE CLOCK SIGNAL OR SUPPLY VOLTAGE | STOP (OR RESTART) SUPPLY OF CLOCK SIGNAL | STOP (OR RESTART) SUPPLY OF SUPPLY POWER |
|---|---|---|---|---|
|  |  | PATTERN 1 | PATTERN 2 | PATTERN 2 |
| CPU | BUS MASTER 1 | TYPE 1 | TYPE 1 | TYPE 2 |
| DSP | BUS MASTER 2 | TYPE 1 | TYPE 1 | TYPE 3 |
| MEMORY | BUS SLAVE | TYPE 1 | TYPE 1 | TYPE 3 |
| ACC | BUS MASTER 1 + BUS SLAVE | TYPE 1 | TYPE 1 | TYPE 2 |
| DMAC | BUS MASTER 2 + BUS SLAVE | TYPE 1 | TYPE 1 | TYPE 3 |

FIG. 7

| STATE SAVING OPERATION TYPE | OPERATION |
|---|---|
| TYPE1 | IT IS POSSIBLE TO SAVE STATE WITHOUT ANY OPERATION. |
| TYPE2 | IT IS POSSIBLE TO SAVE AND RESTORE STATE BY OUTPUTTING REQUEST FROM COMMUNICATION UNIT. |
| TYPE3 | BY PROHIBITING NEW JOB ASSIGNMENT OR NEW USE BY OTHER FUNCTIONAL BLOCK IN RESOURCE MANAGEMENT UNIT, IT IS POSSIBLE NOT TO NEED TO EXECUTE SPECIAL STATE SAVING PROCESS. |

FIG. 8

| TYPE \ BEHAVIOR | TYPE 1 | TYPE 2 | TYPE 3 |
|---|---|---|---|
| BUS MASTER 1 | BEHAVIOR MA-T1 | BEHAVIOR MA-T2 | |
| BUS MASTER 2 | BEHAVIOR MB | | BEHAVIOR MB |
| BUS SLAVE | BEHAVIOR S-T1 | | BEHAVIOR S-T3 |
| BUS MASTER 1 + BUS SLAVE | BEHAVIOR MAS-T1 | BEHAVIOR MAS-T2 | |
| BUS MASTER 2 + BUS SLAVE | BEHAVIOR MBS-T1 | | BEHAVIOR MBS-T3 |

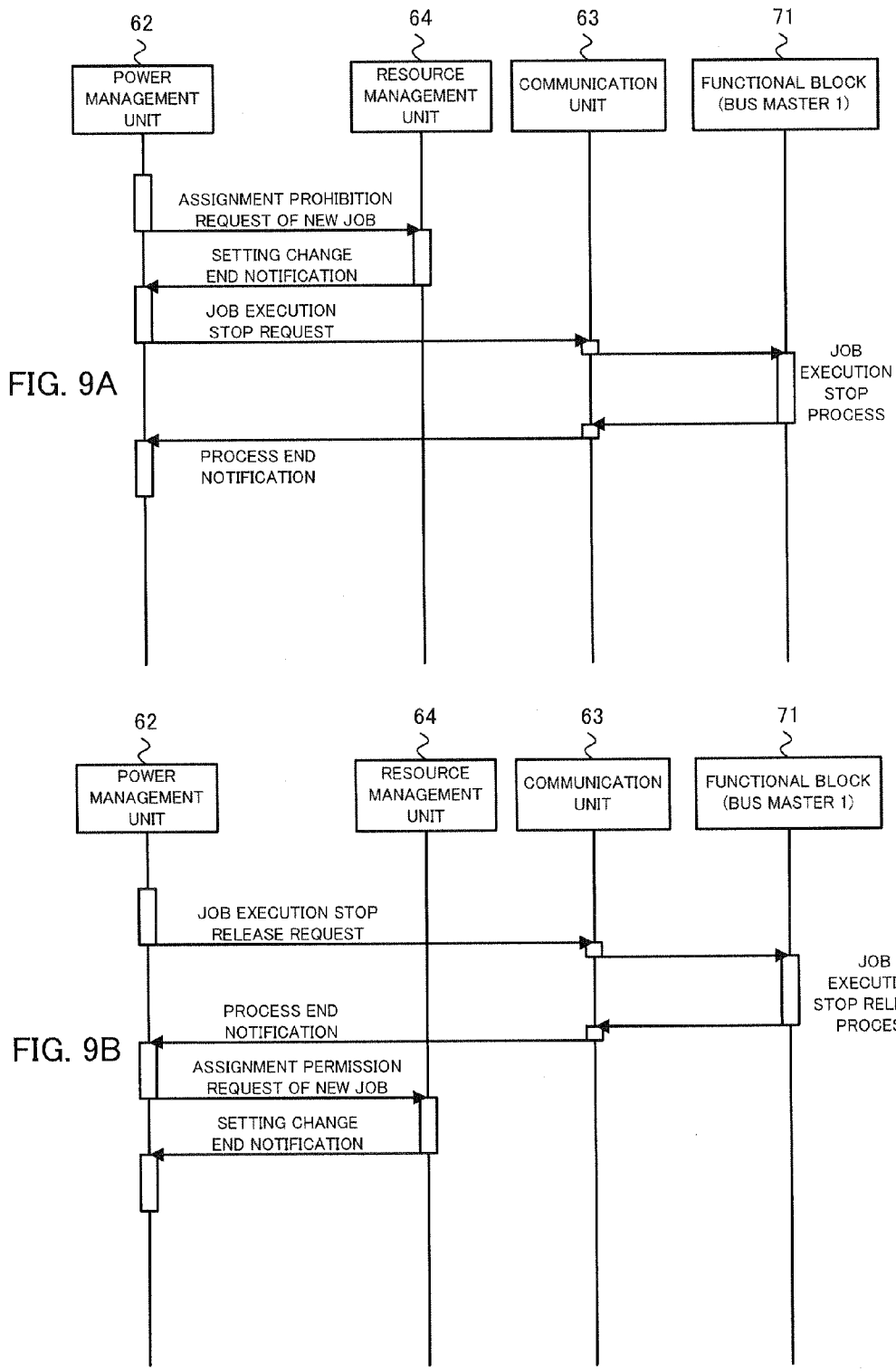

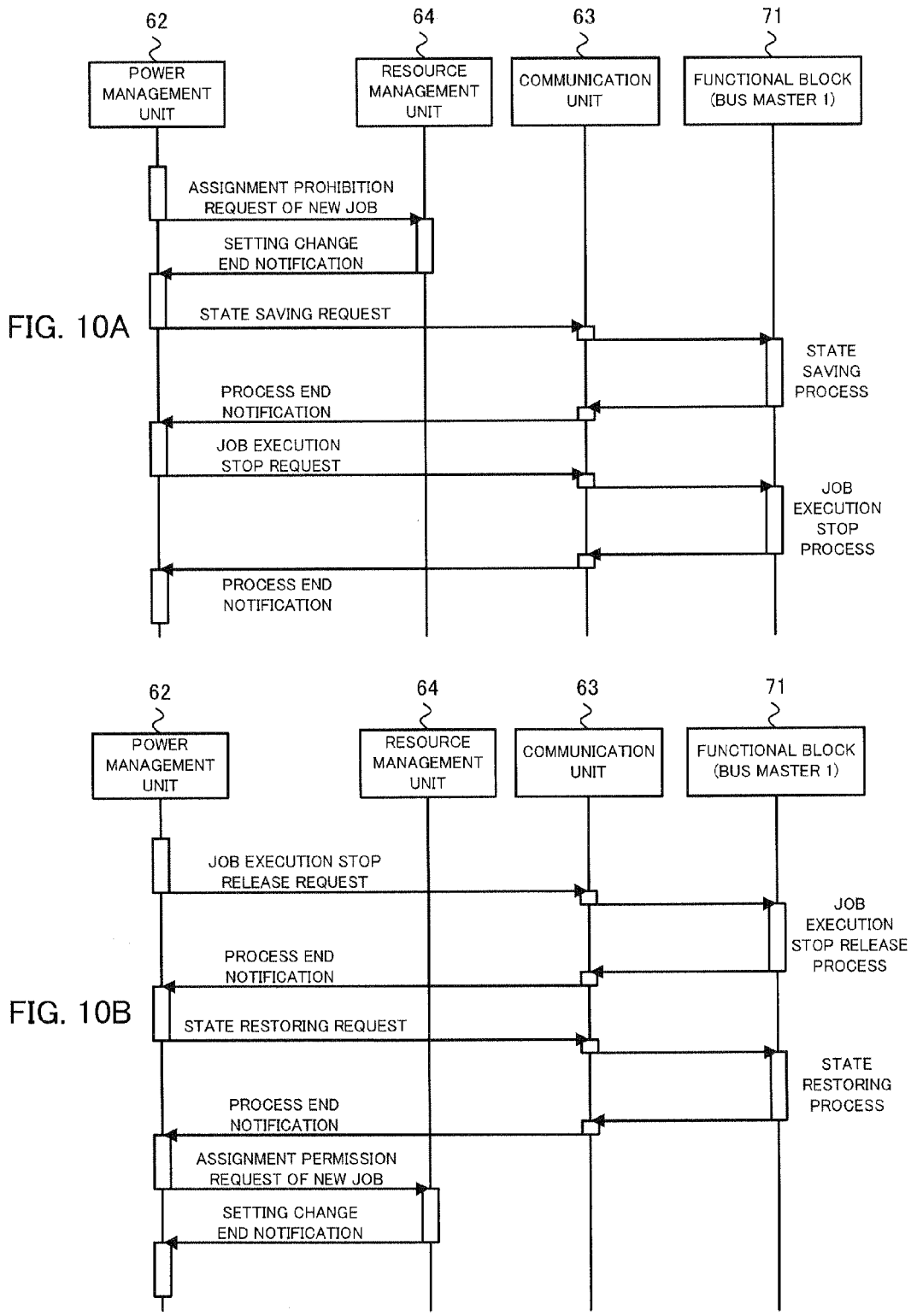

POWER MANAGEMENT CIRCUIT, POWER MANAGEMENT METHOD AND POWER MANAGEMENT PROGRAM FOR CONTROLLING POWER SUPPLIED TO FUNCTIONAL BLOCKS IN INTEGRATED CIRCUITS

CROSS-REFERENCE TO RELATED APPLICATIONS

This application is based upon and claims the benefit of priority of the prior Japanese Patent Application No. 2009-137658 filed on Jun. 8, 2009, the entire contents of which are incorporated herein by reference.

BACKGROUND OF THE INVENTION

1. Field

This invention relates to a power management circuit, a power management method and a power management program, which control a power supplied to functional blocks in a hardware.

2. Background

In recent years, by progress of a miniaturization technology, there appears such integrated circuits that the functional blocks including processor cores, memories, DMAs (Direct Memory Access) are provided on one chip. In these circuits, there is a problem that increasing a circuit scale causes an increase of a consumed power.

A method to suppress the increase of the consumed power in these circuits includes a method to limit the power supplied to the functional blocks not being used.

As an example of this method, there is proposed a technique of managing the use ranges of the memories and turning off the power of memory blocks not being used (see Japanese Patent Applications Laid-open under No. 2005-196545 and No. H09-212416, for example).

By the way, when the supply of the power is controlled for each functional block, a chip area increases because the power supply system and the control circuit of the power supply are provided separately for each functional block. Therefore, there is a method for suppressing the increase of the chip area, which not controls the power for each functional block but controls the power for each unit such as "domain" into which the functional blocks are organized.

In this way, when the power control is executed for each domain, a control program that controls other functional blocks not to access to the functional blocks in the domain under the power control is embedded in the application. In this case, it is necessary for the application to execute the control such that the other functional blocks do not access to all the functional blocks belonging to the domain subjected to the control. But, this control operation is complicated in case that there are many functional blocks in the domain because this operation is different in accordance with the type of the functional block subjected to the control and the content of the power control operation. In addition, this control operation is different in accordance with the configuration of the functional blocks in the domain. Therefore, in case that the domain groupings are different even if the functional blocks have the same configuration, or changing the functional blocks or adding new functional blocks are performed in the future, it is necessary to significantly change the power control program embedded in the application, which lead to the problems including an increase of a development man-hours of the application and a deterioration of the reusability.

SUMMARY

A disclosed device has a resource management unit which performs use management of a functional block in an integrated circuit, and a power management unit which transmits a power control request to a power control device which controls power of the functional block for each domain. The power control request designates the domain and the power control content for the domain. The power management unit executes a use prohibition process prohibiting the use of the functional block belonging to the domain, by using the resource management unit before transmitting the power control request to the power control device, in accordance with a type of the functional block belonging to the domain and the power control content.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is a diagram collectively showing a relationship between the domain, a feasible operation for the domain, and the functional block belonging to the domain;

FIG. 4 is a diagram showing the relationship between the control type of the power control content and the control process;

FIG. 6 is a diagram showing the state saving operation types corresponding to the bus access control types of the functional blocks and the power control content;

FIG. 7 is a diagram showing the feature about the state saving operation types;

FIG. 8 is a diagram showing the behavior types in accordance with the bus access control types and the state saving operation types;

FIGS. 9A and 9B are sequence diagrams showing the control method in case that the behavior type is determined to the behavior MA-T1;

FIGS. 10A and 10B are sequence diagrams showing the control method in case that the behavior type is determined to the behavior MA-T2;

DESCRIPTION OF EMBODIMENTS

An example of an embodiment will now be described below with reference to the attached drawings.

[Apparatus Configuration]

Figure 1:
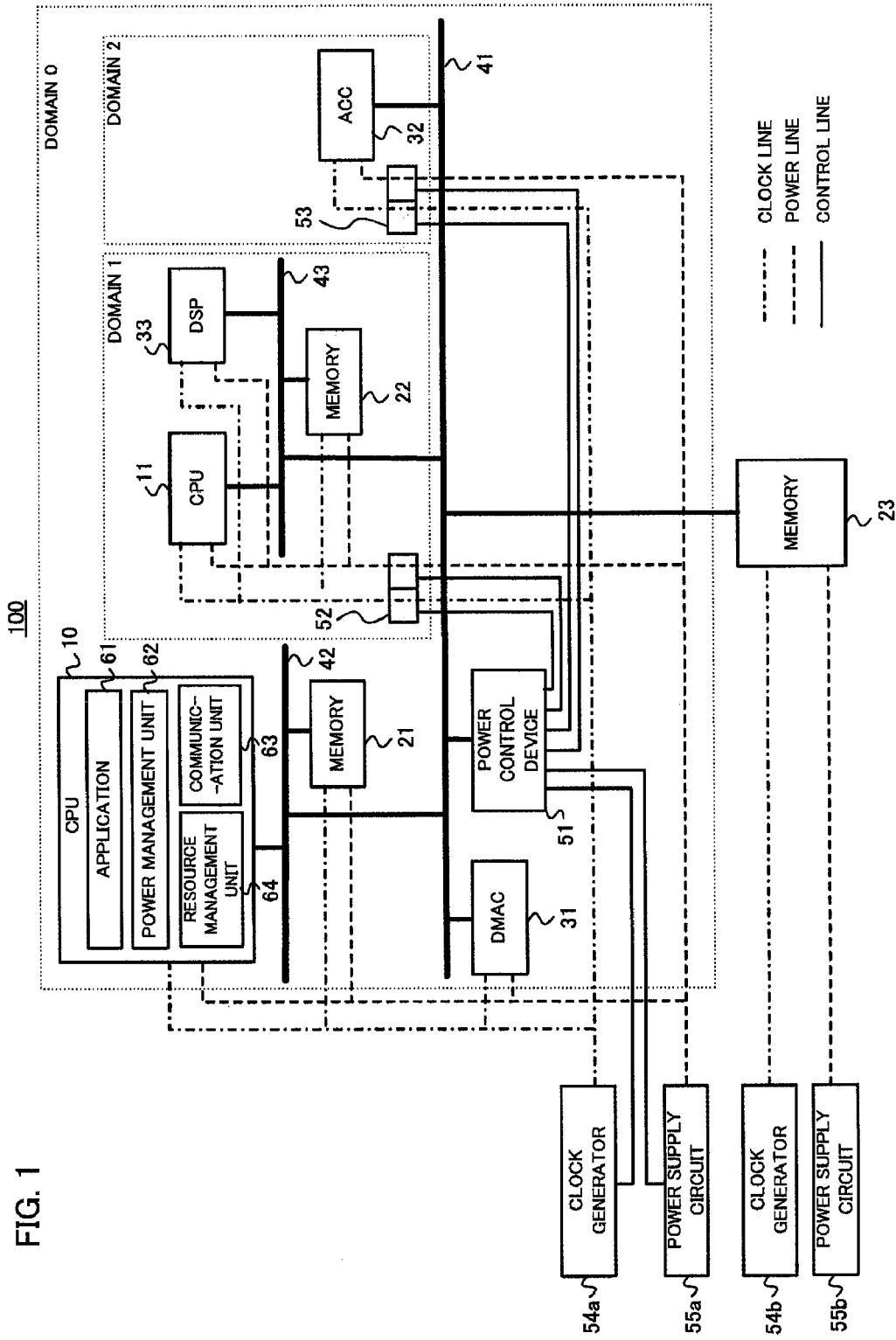
FIG. 1 is a block diagram showing an example of configuration of the integrated circuit according to the embodiment.

A description will be given of configuration of an integrated circuit according to the embodiment, with reference to FIG. 1. FIG. 1 is a block diagram which shows an example of configuration of the integrated circuit according to the embodiment.

An integrated circuit 100 shown in FIG. 1 has such a configuration that a number of functional blocks are connected to buses 41, 42, 43. The buses 41, 42, 43 are connected to each other. The integrated circuit 100 has, as the functional blocks, Central Processing Units (CPU) 10, 11 and memories 21, 22, 23. Also, the integrated circuit 100 has, as the functional blocks, a Direct Memory Access Controller (DMAC) 31, an accelerator (ACC) 32 and a Digital Signal Processor (DSP) 33.

The CPU 10 and the memory 21 are connected to the bus 42. The CPU 11, the memory 22 and the DSP 33 are connected to the bus 43. The buses 42, 43 are connected to the bus 41. The DMAC 31, the memory 23 and the ACC 32 are connected to the bus 41.

Clock signal is supplied by a clock generator and a supply power is supplied by a power supply circuit, to each functional block respectively in the integrated circuit 100. In FIG. 1, a chain line shows a clock line and a dashed line shows a power line. In addition, a slight solid line, which is extended from a power control device 51, shows a control line. Now, in the integrated circuit 100 according to the embodiment, a power control is performed in units of domain. At least one functional block belongs to each domain. In the example of FIG. 1, three domains, i.e., domain 0, domain 1 and domain 2, are defined on the integrated circuit 100, and the power control device 51 performs the power control of the functional blocks collectively for each domain.

The CPUs 10, 11, the memories 21, 22, the DMAC 31, the ACC 32 and the DSP 33 belong to the domain 0. In addition, the CPU 11, the memory 22 and the DSP 33 belong to the domain 1. The ACC 32 belongs to the domain 2.

The clock signal is supplied by a clock generator 54a and the supply power is supplied by a power supply circuit 55a, to all functional blocks belonging to the domain 0. In addition, the clock signal is supplied by a clock generator 54b and the supply power is supplied by a power supply circuit 55b, to the memory 23 not belonging to the domain 0. The clock generator 54a and the power supply circuit 55a are controlled by the power control device 51.

A switch 52 is provided to the clock lines and the power lines which are connected to all functional blocks belonging to the domain 1. A switch 53 is provided to the clock lines and the power lines which are connected to all functional blocks belonging to the domain 2. The switch 52 is a device to stop or restart the supply of the clock signal or the supply power to all functional blocks belonging to the domain 1. The switch 53 is a device to stop or restart the supply of the clock signal or the supply power to all functional blocks belonging to the domain 2. Each of the switches 52, 53 is controlled by the power control device 51.

FIG. 2 collectively shows a relationship between the domain, a feasible operation for the domain, and the functional blocks belonging to the domain.

As described previously, the CPUs 10, 11, the memories 21, 22, the DMAC 31, the ACC 32 and the DSP 33 belong to the domain 0. In addition, the clock signal is supplied by the clock generator 54a and the supply power is supplied by the power supply circuit 55a, to these functional blocks belonging to the domain 0. The clock generator 54a and the power supply circuit 55a are controlled by the power control device 51. The power control device 51 can change a frequency of the clock signal supplied to all functional blocks belonging to the domain 0, by controlling the clock generator 54a. In addition, the power control device 51 can change a voltage of the supply power supplied to all functional blocks belonging to the domain 0, by controlling the power supply circuit 55a. Thus, the feasible operation for the domain 0 includes the change of the frequency of the clock signal or the change of the voltage of the supply power (hereinafter referred to as "the change of the clock signal or the supply voltage").

The CPU 11, the memory 22 and the DSP 33 belong to the domain 1, and the ACC 32 belongs to the domain 2. The switch 52 is provided to the clock lines and the power lines which are connected to all functional blocks belonging to the domain 1, and the switch 53 is provided to the clock lines and the power lines which are connected to all functional blocks belonging to the domain 2. As described previously, each of the switches 52, 53 is controlled by the power control device 51. The power control device 51 can collectively stop or restart the supply of the clock signal or the supply power, by controlling the switch 52, to all functional blocks belonging to the domain 1. In addition, the power control device 51 can collectively stop or restart the supply of the clock signal or the supply power, by controlling the switch 53, to all functional blocks belonging to the domain 2. Thus, the feasible operation for each of the domains 1, 2 includes the stop or the restart of the supply of the clock signal or the supply power.

The power control device 51 receives a power control request from the CPU 10, the power control request designating the power control content and the domain which is an object of the power control (hereinafter referred to as "power control object domain"). The power control device 51 performs the above-mentioned power control to the functional blocks belonging to the power control object domain, based on the power control request received from the CPU 10.

In the integrated circuit 100 according to the embodiment, the CPU 10 puts the functional blocks into a power controllable state, by executing the use prohibition process prohibiting the use of the functional blocks belonging to the power control object domain, before transmitting the power control request to the power control device 51. Therefore, the CPU 10 functions as the power management circuit. A function of the CPU 10 will be concretely described below.

An application 61, a power management unit 62, a resource management unit 64 and a communication unit 63 operate on the CPU 10. For example, the application 61 is a process which operates by executing a program such as an application software on the CPU 10. The power management unit 62, the resource management unit 64 and the communication unit 63 are processes which operate by executing programs on the CPU 10.

Figure 3:
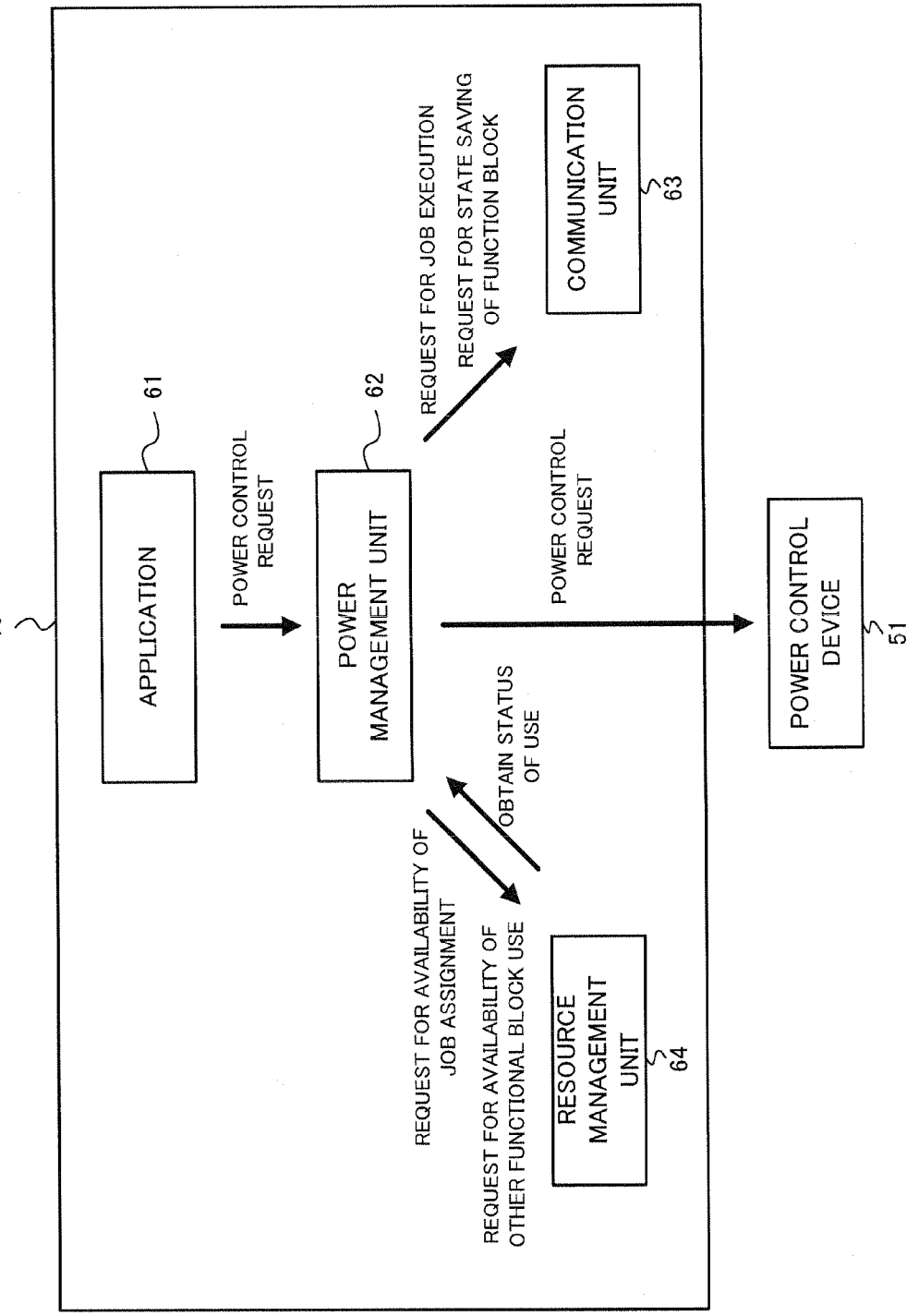
FIG. 3 is a schematic diagram showing the process of the power management unit in the power management circuit.

FIG. 3 is a schematic diagram showing the process of the power management unit 62 in the CPU 10. The application 61 transmits, as necessary, the power control request designating the power control content and the power control object domain to the power management unit 62.

The power management unit 62 manages the state of the functional blocks belonging to the power control object domain. The power management unit 62 transmits a request to the resource management unit 64, the request being related to availability of job assignment or availability of other functional blocks use, about the functional blocks belonging to the power control object domain. In addition, the power management unit 62 obtains status of the use by other functional blocks, for the functional blocks belonging to the power control object domain. Furthermore, the power management unit 62 transmits a request to the functional blocks belonging to the power control object domain, through the communication unit 63, the request related to already assigned job execution or state saving of the functional blocks.

The communication unit 63 is an interface for the power management unit 62 transmitting a request to the functional blocks. The resource management unit 64 performs a use management of the functional blocks in the integrated circuit 100. For example, the resource management unit 64 manages the status of the use and the availability of use of all functional blocks in the integrated circuit 100. In the integrated circuit 100, each functional block queries the resource management unit 64 when trying to use other functional blocks, and then each functional block can access the other functional blocks only when obtaining permission from the resource management unit 64. In addition, the resource management unit 64 assigns a job to the functional blocks, for example CPU, to which the job can be assigned.

The power management unit 62 can use a resource management function and a communication function which the Operating System (OS) usually has, as the resource management unit 64 and the communication unit 63, respectively. Furthermore, the power management unit 62, the resource management unit 64 and the communication unit 63 are not limited to operate as a software process. Needless to say, instead, the power management unit 62, the resource management unit 64 and the communication unit 63 can operate as a hardware circuit.

When the power management unit 62 receives the power control request designating the power control content and the power control object domain from the application 61, the power management unit 62 determines a control process being required, in accordance with the power control content. For example, the power management unit 62 executes the use prohibition process prohibiting the use of the functional blocks belonging to the power control object domain, before transmitting the power control request, when the power control content indicates the change of the clock signal or the supply voltage, or indicates the stop of the supply of the supply power.

A control of the use prohibition process is determined based on types of the functional blocks belonging to the power control object domain and the power control content. The power management unit 62 determines the behavior types of the functional blocks, based on the type of the functional blocks belonging to the power control object domain and the power control content, and executes the use prohibition process prohibiting the use of the functional blocks in accordance with the behavior type being determined.

As understood from the above explanation, in the integrated circuit according to the embodiment, the use prohibition process for the functional blocks belonging to the power control object domain is executed by the power management unit 62. Therefore, the application 61 does not have to execute the use prohibition process by itself. In other words, the use prohibition process is executed by the power management unit 62 automatically, based on the power control content and the power control object domain, only if the application 61 transmits the power control request, to the power management unit 62, designating the power control content and the power control object domain. In this method, it is possible not to install a control program for executing the use prohibition process into application 61.

[Control Process]

Next, the control process of the power management unit 62 will be concretely described.

FIG. 4 is a diagram which shows the relationship between the control type of the power control content and the control process.

The power management unit 62 classifies the power control content into any control type of the pattern 1, the pattern 2-1 and the pattern 2-2, and performs the control process in accordance with each control type, when the power management unit 62 receives the power control request from the application 61. The power control content classified into pattern 1 includes the change of the clock signal or the supply voltage. The power control content classified into pattern 2-1 includes the stop of the supply of the clock signal or the supply power. The power control content classified into pattern 2-2 includes the restart of the supply of the clock signal or the supply power.

The description will be given of the control process of the power management unit 62 when the power control content is classified into the pattern 1 (namely, when the power control content is the change of the clock signal or the supply voltage).

The power management unit 62 executes the use prohibition process prohibiting the use of the functional blocks belonging to the power control object domain, when the power management unit 62 receives the power control request including the power control content classified into the pattern 1 from the application 61. In the use prohibition process according to the pattern 1, the power management unit 62 determines, based on the power control content and the types of the functional blocks belonging to the power control object domain, the behavior types of the functional blocks and executes the use prohibition process prohibiting the use of the functional blocks in accordance with the behavior types determined. For example, the power management unit 62 prohibits the assignment of new job to the functions blocks or new use by the other functional blocks by using the resource management unit 64, with respect to the functional blocks belonging to the power control object domain.

The power management unit 62 transmits the power control request to the power control device 51 after executing the use prohibition process with respect to the functional blocks belonging to the power control object domain. The power control device 51 performs the power control for the functional blocks belonging to the power control object domain, based on the power control request transmitted from the power management unit 62. After the power control device 51 performs the power control for the functional blocks belonging to the power control object domain, the power control device 51 transmits the power control end notification to the power management unit 62, the power control end notification showing the end of performing the power control. In this method, the power management unit 62 can recognize the end of the power control performed by the power control device 51 in accordance with the power control request transmitted.

Here, as described above, the power control content classified into pattern 1 includes the change of the clock signal or the supply voltage. The functional blocks belonging to the power control object domain may be used by the other functional blocks or the resource management unit 64, after the power control is performed by the power control device 51. Therefore, the power management unit 62 executes the use permission process permitting the use of the functional blocks belonging to the power control object domain, after the power management unit 62 receives the power control end notification from the power control device 51. In the use permission process according to the pattern 1, in the same way as the case of the use prohibition process, the power management unit 62 determines the behavior types of the functional blocks belonging to the power control object domain and executes the use permission process permitting the use of the functional blocks in accordance with the behavior types determined. For example, the power management unit 62 permits the assignment of new job to the functional blocks or new use by the other functional blocks, by using the resource management unit 64, with respect to the functional blocks belonging to the power control object domain. In this way, it is possible for the other functional blocks and the resource management unit 64 to use the functional blocks belonging to the power control object domain, after the power control is performed by the power control device 51.

As understood from the above explanation, when the power control content is the change of the clock signal or the supply voltage, the use permission process is performed by the power management unit 62 without the request from the application 61, after the power control is performed by the power control device 51. In other words, the application 61 does not need to recognize the end of the power control by the power control device 51 and to transmit the request for performing the use permission process to the power management unit 62. Therefore, it is possible to simplify the control by the application 61.

Next, the description will be given of the control process of the power management unit 62 when the power control content is classified into the pattern 2-1 (namely, when the power control content is the stop of the supply of the clock signal or the supply power).

In the same way as the case of the control process according to the pattern 1, the power management unit 62 executes the use prohibition process prohibiting the use of the functional blocks belonging to the power control object domain, when the power management unit 62 receives the power control request including the power control content classified into the pattern 2-1 from the application 61. The power management unit 62 transmits the power control request to the power control device 51 after the power management unit 62 executes the use prohibition process with respect to the functional blocks belonging to the power control object domain.

The power control device 51 performs the power control for the functional blocks belonging to the power control object domain, based on the power control request transmitted from the power management unit 62. As described above, the power control content classified into pattern 2-1 includes the stop of the supply of the clock signal or the supply power. Therefore, there is no chance that the functional blocks belonging to the power control object domain are used by other functional blocks until the supply of the clock signal or the supply power is restarted, after the power control is performed by the power control device 51. Thus, unlike the control process according to the pattern 1, in the control process according to the pattern 2-1, the power management unit 62 does not execute the use permission process about the functional blocks belonging to the power control object domain, after the power control is performed by the power control device 51.

Next, the description will be given of the control process of the power management unit 62 when the power control content is classified into the pattern 2-2 (namely, when the power control content is the restart of the supply of the clock signal or the supply power). The power control classified into the pattern 2-2 is performed after the power control classified into the pattern 2-1 is performed to the functional blocks belonging to the power control object domain. Therefore, the functional blocks belonging to the power control object domain are in such a state that the supply of the clock signal or the supply power are stopped, when the power management unit 62 receives the power control request including the power control content classified into the pattern 2-2.

When the power management unit 62 receives the power control request including the power control content classified into the pattern 2-2 from the application 61, the power management unit 62 transmits the power control request to the power control device 51. The power control device 51 performs the power control for the functional blocks belonging to the power control object domain, based on the power control request transmitted from the power management unit 62. Namely, the power control device 51 restarts the supply of the clock signal or the supply power for the functional blocks belonging to the power control object domain. After the power control device 51 performs the power control for the functional blocks belonging to the power control object domain, the power control device 51 transmits the power control end notification to the power management unit 62, the power control end notification showing the end of performing the power control.

In the same way as the case of the control process according to the pattern 1, the power management unit 62 executes the use permission process with respect to the functional blocks belonging to the power control object domain, after the power management unit 62 receives the power control end notification from the power control device 51.

Figure 5:
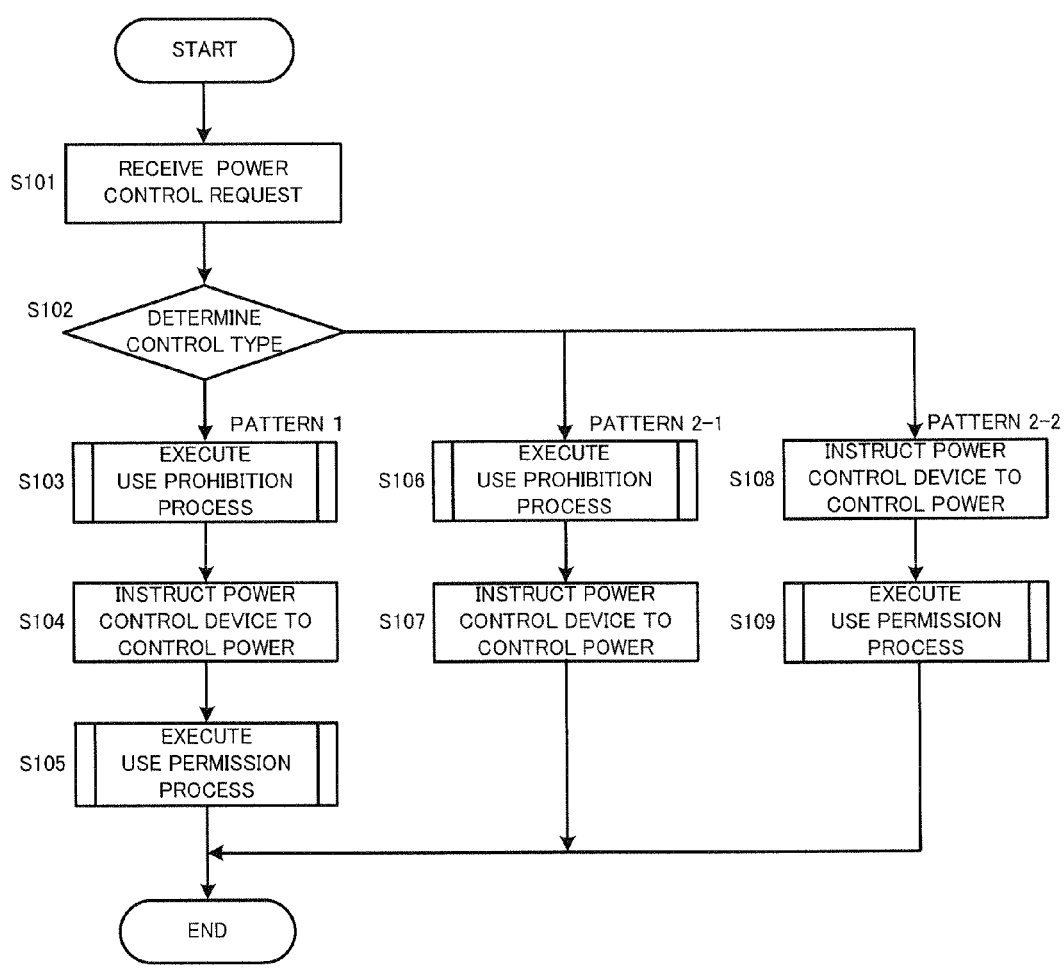
FIG. 5 is a flow chart showing the flow of the control process before and after performing the power control.

The above-mentioned control process will be described by using a flow chart of FIG. 5. FIG. 5 is the flow chart which shows the flow of the control process before and after performing the power control for the power control object domain.

First, the power management unit 62 receives the power control request from the application 61 in step S101, and determines the control type based on the power control content in step S102. The power management unit 62 classifies the control type into the pattern 1 when the power control content includes the change of the clock signal or the supply voltage. The power management unit 62 classifies the control type into the pattern 2-1 when the power control content includes the stop of the clock signal or the supply power, and classifies the control type into the pattern 2-2 when the power control content includes the restart of the clock signal or the supply power.

In step S102, when the power management unit 62 determines that the control type is classified into the pattern 1, the process goes to step S103. In step S103, the power management unit 62 executes the use prohibition process with respect to all functional blocks belonging to the power control object domain. Thereafter, in step S104, the power management unit 62 transmits the power control request to the power control device 51. When the power control device 51 receives the power control request from the power management unit 62, the power control device 51 performs the power control for all functional blocks belonging to the power control object domain, and then transmits the power control end notification to the power management unit 62. In the next step S105, when the power management unit 62 receives the power control end notification, the power management unit 62 executes the use permission process with respect to all functional blocks belonging to the power control object domain. Afterward, the power management unit 62 ends the process. In the process, the application 61 does not need to recognize the end of the power control by the power control device 51 and to transmit the request for performing the use permission process to the power management unit 62, and therefore it is possible to simplify the control by the application 61.

In step S102, when the power management unit 62 determines that the control type is classified into the pattern 2-1, the process goes to step S106. In step S106, the power management unit 62 executes the use prohibition process with respect to all functional blocks belonging to the power control object domain. Thereafter, in step S107, the power management unit 62 transmits the power control request to the power control device 51. When the power control device 51 receives the power control request from the power management unit 62, the power control device 51 performs the power control for all functional blocks belonging to the power control object domain. Afterward, the power management unit 62 ends the process.

In step S102, when the power management unit 62 determines that the control type is classified into the pattern 2-2, the process goes to step S108. In step S108, the power management unit 62 transmits the power control request to the power control device 51. When the power control device 51 receives the power control request from the power management unit 62, the power control device 51 performs the power control for all functional blocks belonging to the power control object domain and then transmits the power control end notification to the power management unit 62 after performing the power control. In the next step S109, when the power management unit 62 receives the power control end notification, the power management unit 62 executes the use permission process with respect to all functional blocks belonging to the power control object domain. Afterward, the power management unit 62 ends the process.

[Use Prohibition Process and Use Permission Process]

Next, the use prohibition process and the use permission process for each functional block belonging to the power control object domain will be concretely described.

In order that the power control of a certain domain becomes possible, it is necessary that all functional blocks belonging to the domain do not perform the bus access to outside, do not receive the bus access from outside and continue to save the pre-operation state correctly after the power control operation. Therefore, the use prohibition process is to operate all the functional blocks belonging to the power control object domain to become the above-mentioned state, and the use permission process is to operate to release the above-mentioned state.

In this embodiment, the operation for the functional blocks in the power control object domain is determined in accordance with a combination of the two elements, one element being what type of the control of the bus access is available for the functional blocks in the power control object domain, and the other element being what type of the operation should be performed to save the state in case of performing the power control operation required to the functional blocks in the power control object domain.

Therefore, in either case of the use prohibition process or the use permission process, the power management unit 62 determines the behavior types for all functional blocks belonging to the power control object domain, based on the type of each functional block and the power control content. The power management unit 62 executes the use prohibition process or the use permission process for all functional blocks belonging to the power control object domain, in accordance with the behavior type determined, by using the resource management unit 64 with or without communication unit 63.

Specifically, the power management unit 62 determines the types of the bus access control of the functional blocks, as the types of the functional blocks belonging to the power control object domain. The power management unit 62 determines the state saving operation types as the operation types indicating whether or not to save the state of the functional blocks, based on the bus access control types and the control types of the power control content. Then, the power management unit 62 determines the operation types based on the bus access control types and the state saving operation types.

The method for determining the state saving operation types about the functional blocks belonging to the power control object domain will be described by using FIG. 6 and FIG. 7. FIG. 6 is a diagram showing the state saving operation types corresponding to the bus access control types of the functional blocks and the power control content. FIG. 7 is a diagram showing the feature about the state saving operation types.

The power management unit 62 determines the types of the bus access control with respect to the functional blocks belonging to the power control object domain, and determines the state saving operation types based on the power control content and the bus access control types determined by using the relationship which FIG. 6 shows.

The method for determining the types of the bus access control will be described. The types of the bus access control are classified into the bus master 1, the bus master 2, the bus slave, the bus master 1+the bus slave, and the bus master 2+the bus slave, based on the features of the behaviors of the functional blocks.

The bus master, to which the job is assigned by the resource management unit 64, has the function to actively start the data transfer on the bus. For example, the processors including the CPU and the DSP have the function of the bus master, so the processors are classified into the bus master as the type of the bus access control. On the other hand, the bus slave has the function to passively transfer the data on the bus. For example, the memories have the function of the bus slave, so the memories are classified into the bus slave as the type of the bus access control.

Here, the bus master 1 has the function to accept the control request from outside. For example, the bus master 1 has the function to stop executing the job already assigned by the resource management unit 64, when the bus master 1 receives the request from the power management unit 62. Namely, the bus master 1 stops executing the job when the bus master 1 receives the job execution stop request from the power management unit 62, even after the job is assigned by the resource management unit 64. In addition, the bus master 1 has the function to save the state by the request from outside. Namely, the bus master 1 saves the stored data in the register to the nonvolatile memories when the bus master 1 receives the state saving request from the power management unit 62. An example of the bus master 1 is the CPU.

On the other hand, the bus master 2 does not have the function to accept the control request from outside. The bus master 2 cannot stop executing the job assigned by the resource management unit 64, by using the request from the power management unit 62. An example of the bus master 2 is the DSP.

The functional blocks having the function of both the bus master and the bus slave includes the DMAC and the ACC. For example, the DMAC has the function of the bus master in view of the assigned job executing the data transfer to the bus slave such as the memories, and has the function of the bus slave in view of receiving the instruction and the address from at least one CPU. The functional blocks having the function of both the bus master 1 and the bus slave includes the ACC. The functional blocks having the function of both the bus master 2 and the bus slave includes the DMAC.

As described previously, the bus master 1 includes the CPU and the bus master 2 includes the DSP, but the embodiment is not limited to this. The difference between the bus master 1 and the bus master 2 depends on whether or not the functional block has the function to accept the control request from outside. Therefore, even if the functional block is the CPU, the CPU not having the function to accept the control request from outside is classified into the bus master 2. In addition, even if the functional block is the DSP, the DSP having the function to accept the control request from outside is classified into the bus master 1. The same is equally true of the ACC and the DMAC which are referred to as the functional blocks having both of the bus master 1 and the bus master 2.

The state saving operation type can be classified into the 3 types which FIG. 7 shows, based on the features of the functional blocks and the type of the power control content.

The type 1 shows that it is possible to save the state without any operation. The supply power is supplied to the functional block, when the power control content is the change of the clock signal or the supply voltage, or the stop (or the restart) of the supply of the clock signal. Therefore, the state of the functional block is saved without any operation. Namely, the stored data in the register of the functional block is saved. This is why the state saving operation type of the bus master 1, the bus master 2 and the bus slave is determined to be the type 1 when the power control content is the change of the clock signal or the supply voltage, or the stop (or the restart) of the supply of the clock signal.

The state saving operation type of the bus master 1 is determined to be the type 2 when the power control content is the stop (or the restart) of the supply power.

The type 2 shows that it is possible to save and restore the state of the functional block by the power control management 62 instructing to the functional blocks via the communication unit 63. The supply power is not supplied to the functional blocks when the power control content is the stop of the supply power. However, when the functional block is the bus master 1, the power management unit 62 can execute the state saving process saving the stored data in the register of the functional block to the nonvolatile memories, and then save the state of the functional block. In addition, when the supply of the supply power is restarted, the power management unit 62 can restore the state of the functional block by executing the state restoring process writing the stored data in the nonvolatile memories to the register of the functional block. This is why the state saving operation type of the bus master 1 is determined to be the type 2 when the power control content is the stop (or the restart) of the supply power.

The state saving operation type of the bus master 2, the bus slave is determined to be the type 3 when the power control content is the stop (or the restart) of the supply power.

The type 3 shows that it becomes not necessary to execute special process for saving the state, by prohibiting new job assignment or new use by other functional blocks in the resource management unit 64. For example, as for the bus slave, when new use by the other functional blocks is prohibited in the resource management unit 64 and the functional blocks using the bus slave ends the access, it is not necessary to save the stored data in the bus slave. As for the bus master 2, when new job assignment is prohibited in the resource management unit 64 and the execution of the already assigned job ends, it is possible to stop the supply of the supply power. This is why the state saving operation type of the bus master 2 or the bus slave is determined to be the type 3 when the power control content is the stop (or the restart) of the supply power.

The power management unit 62 is given, in the design phase of the integrated circuit, the information equivalent to that shown in FIG. 6 and for determining the bus access control types and the state saving operation types from the functional block types and the power control content. The power management unit 62 determines, based on the information, the behavior type for executing the use prohibition process or the use permission process for the functional blocks in the control object domain.

FIG. 8 is a diagram showing the behavior types in accordance with the bus access control types and the state saving operation types.

The power management unit 62 determines the behavior type of the functional blocks belonging to the power control object domain, by using the relationship which FIG. 8 shows, based on the bus access control types and the state saving operation types determined as described above. For example, the power management unit 62 determines the behavior type to be the behavior MA-T1, when the bus access control type is the bus master 1 and the state saving operation type is the type 1. The power management unit 62 executes the use prohibition process or the use permission process in accordance with the behavior type being determined.

The control method of the use prohibition process and the use permission process for each behavior type will be concretely described below with reference to FIGS. 9-18.

FIGS. 9A and 9B are the sequence diagrams showing the control method in case that the behavior type of the functional block is determined to the behavior MA-T1. FIG. 9A is the sequence diagram showing the control method of the use prohibition process in the behavior MA-T1, and FIG. 9B is the sequence diagram showing the control method of the use permission process in the behavior MA-T1. In FIGS. 9A and 9B, the functional block 71 indicates the functional block, as the control object, belonging to the power control object domain (the same are true of FIGS. 10-17).

The behavior type of the functional block 71 is determined to the behavior MA-T1 when the bus access control type of the functional block 71 is the bus master 1 and the state saving operation type is the type 1. Namely, it is when the power control content is the change of the clock signal or the supply voltage, or the stop (or the restart) of the supply of the clock signal.

The control method of the use prohibition process of behavior MA-T1 will be described with reference to FIG. 9A.

The power management unit 62, in case of executing the use prohibition process, transmits the assignment prohibition request to the resource management unit 64, the assignment prohibition request prohibiting the new job assignment to the functional block 71. The resource management unit 64 configures the setting for not assigning the new job to the functional block 71, when the resource management unit 64 receives the assignment prohibition request from the power management unit 62. When the resource management unit 64 completes the setting, the resource management unit 64 transmits the setting change end notification to the power management unit 62.

Here, the functional block 71 can stop executing the job already assigned by the resource management unit 64, by the control request from outside, because the bus access control type of the functional block 71 is the bus master 1. Therefore, when the power management unit 62 receives the setting change end notification from the resource management unit 64, the power management unit 62 transmits the job execution stop request requesting the stop of the execution of the job to the functional block 71 via the communication unit 63. When the functional block 71 receives the job execution stop request from the power management unit 62, the functional block 71 executes the job execution stop process to stop executing the job assigned by the resource management unit 64. In this way, the access from the functional block 71 to the other functional blocks is cut off, when the functional block 71 stops the execution of the job. The functional block 71 transmits the process end notification to the power management unit 62 via the communication unit 63, when the job execution stop process ends. In this way, the use prohibition process of the behavior MT-1 is completed.

The control method of the use permission process of behavior MA-T1 will be described with reference to FIG. 9B.

The power management unit 62, in case of executing the use permission process, transmits the job execution stop release request to the resource management unit 64 via the communication unit 63, the job execution stop release request releasing the stop of the execution of the job. When the functional block 71 receives the job execution stop release request from the power management unit 62, the functional block 71 executes the job execution stop release process to permit executing the job assigned by the resource management unit 64. In this way, the functional block 71 can execute the job assigned by the resource management unit 64 and then executes the access to the other functional blocks by executing the job. The functional block 71 transmits the process end notification to the power management unit 62 via the communication unit 63, when the job execution stop release process ends.

When the power management unit 62 receives the process end notification from the functional block 71, the power management unit 62 transmits the assignment permission request to the resource management unit 64, the assignment permission request permitting the new job assignment to the functional block 71. The resource management unit 64 configures the setting for permitting to assign the new job to the functional block 71, when the resource management unit 64 receives the assignment permission request from the power management unit 62. When the resource management unit 64 completes the setting, the resource management unit 64 transmits the setting change end notification to the power management unit 62. In this way, the use permission process of the behavior MA-T1 is completed.

FIGS. 10A and 10B are the sequence diagrams showing the control method in case that the behavior type of the functional block is determined to the behavior MA-T2. FIG. 10A is the sequence diagram showing the control method of the use prohibition process in the behavior MA-T2, and FIG. 10B is the sequence diagram showing the control method of the use permission process in the behavior MA-T2.

The behavior type of the functional block 71 is determined to the behavior MA-T2 when the bus access control type of the functional block 71 is the bus master 1 and the state saving operation type is the type 2. Namely, it is when the power control content is the stop (or the restart) of the supply of the supply power. In this case, the operation for the saving (or the restoring) of the state of the functional block 71 is performed.

The control method of the use prohibition process of behavior MA-T2 will be described with reference to FIG. 10A.

The power management unit 62, in case of executing the use prohibition process, transmits the assignment prohibition request to the resource management unit 64, the assignment prohibition request prohibiting the new job assignment to the functional block 71. The resource management unit 64 configures the setting for not assigning the new job to the functional block 71, when the resource management unit 64 receives the assignment prohibition request from the power management unit 62. When the resource management unit 64 completes the setting, the resource management unit 64 transmits the setting change end notification to the power management unit 62.

When the power management unit 62 receives the setting change end notification from the resource management unit 64, the power management unit 62 transmits the state saving request saving the state of the functional block 71 to the functional block 71 via the communication unit 63. The functional block 71 executes the state saving process saving the stored data in the register of the functional block 71 to the nonvolatile memories when the functional block 71 receives the state saving request from the power management unit 62. In this way, the state of the functional block 71 is saved and then it is possible to restore the state of the functional block 71 in the use permission process of the behavior MA-T2 mentioned later. The functional block 71 transmits the process end notification to the power management unit 62 via the communication unit 63, when the state saving process ends.

When the power management unit 62 receives the process end notification, as the response to the state saving request, from the functional block 71, the power management unit 62 transmits the job execution stop request requesting the stop of the execution of the job to the functional block 71 via the communication unit 63. When the functional block 71 receives the job execution stop request from the power management unit 62, the functional block 71 executes the job execution stop process to stop executing the job already assigned by the resource management unit 64. In this way, the access from the functional block 71 to the other functional blocks is cut off. The functional block 71 transmits the process end notification to the power management unit 62 via the communication unit 63, when the job execution stop process ends. In this way, the use prohibition process of the behavior MT-T2 is completed.

Next, the control method of the use permission process of behavior MA-T2 will be described with reference to FIG. 10B.

The power management unit 62, in case of executing the use permission process, transmits the job execution stop release request to the functional block 71 via the communication unit 63, the job execution stop release request releasing the stop of the execution of the job. When the functional block 71 receives the job execution stop release request from the power management unit 62, the functional block 71 executes the job execution stop release process to permit executing the job assigned by the resource management unit 64. In this way, the functional block 71 can execute the job assigned by the resource management unit 64 and then executes the access to the other functional blocks by executing the job. The functional block 71 transmits the process end notification to the power management unit 62 via the communication unit 63, when the job execution stop release process ends.

When the power management unit 62 receives the process end notification, as the response to the job execution stop release request, from the functional block 71, the power management unit 62 transmits the state restoring request restoring the state of the functional block 71 to the functional block 71 via the communication unit 63. The functional block 71 executes the state restoring process writing the stored data in the nonvolatile memories to the register of the functional block 71, when the functional block 71 receives the state restoring request from the power management unit 62. In this way, the state of functional block 71 is restored to the previous state before the use prohibition process is executed. The functional block 71 transmits the process end notification to the power management unit 62 via the communication unit 63, when the state restoring process ends.

When the power management unit 62 receives the process end notification, as the response to the state restoring request, from the functional block 71, the power management unit 62 transmits the assignment permission request to the resource management unit 64, the assignment permission request permitting the new job assignment to the functional block 71. The resource management unit 64 configures the setting for permitting to assign the new job to the functional block 71, when the resource management unit 64 receives the assignment permission request from the power management unit 62. When the resource management unit 64 completes the setting, the resource management unit 64 transmits the setting change end notification to the power management unit 62. In this way, the use permission process of the behavior MA-T2 is completed.

Figure 11A:
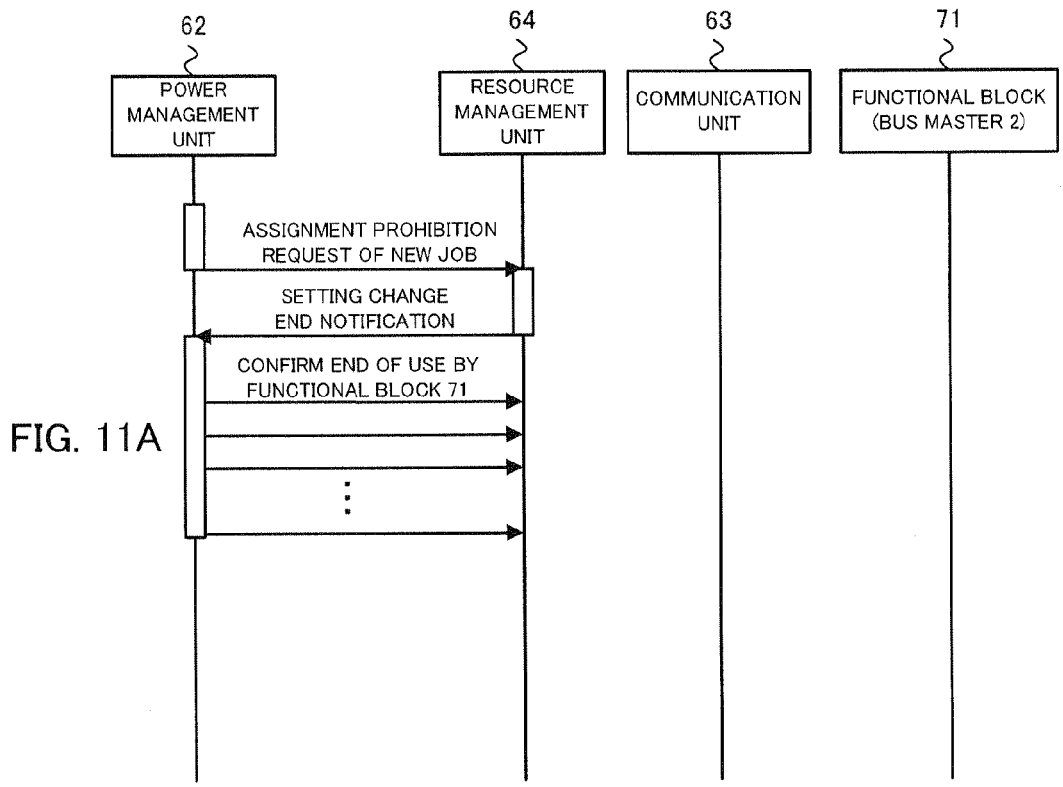
FIGS. 11A and 11B are sequence diagrams showing the control method in case that the behavior type is determined to the behavior MB.
Figure 11B:
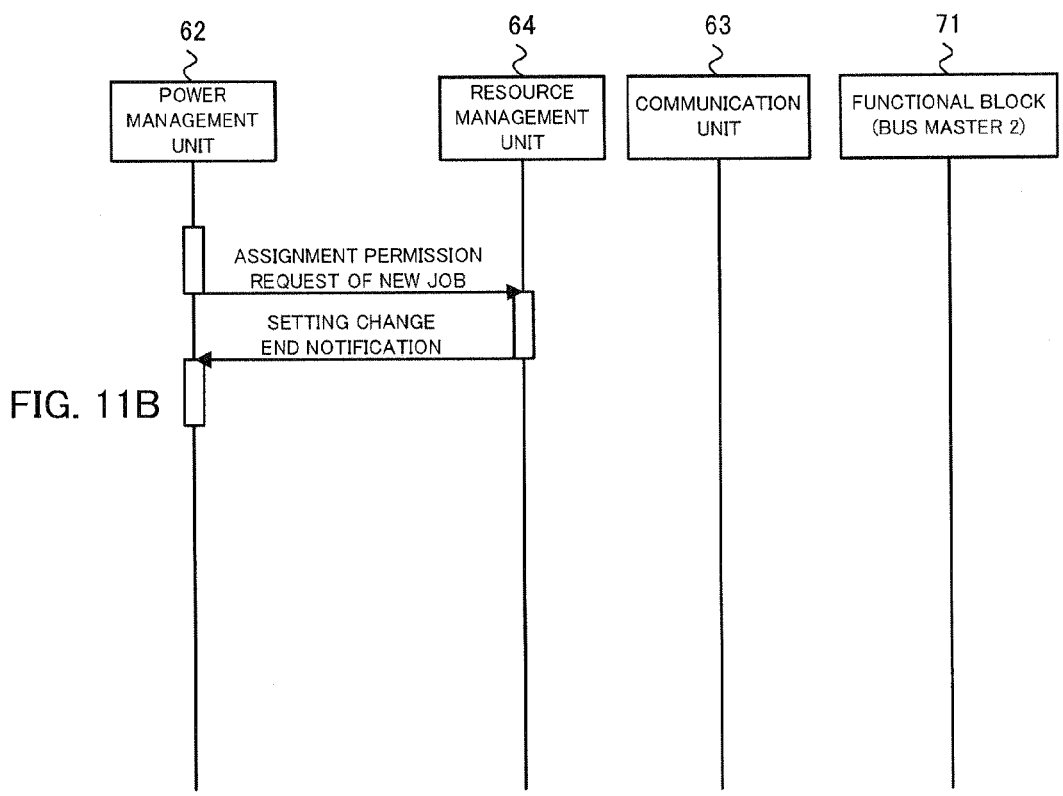

FIGS. 11A and 11B are the sequence diagrams showing the control method in case that the behavior type of the functional block is determined to the behavior MB. FIG. 11A is the sequence diagram showing the control method of the use prohibition process in the behavior MB, and FIG. 11B is the sequence diagram showing the control method of the use permission process in the behavior MB.

The behavior type of the functional block 71 is determined to the behavior MB when the bus access control type of the functional block 71 is the bus master 2 and the state saving operation type is the type 1 or 3. Namely, it is when the power control content is the change of the clock signal or the supply voltage, or the stop (or the restart) of the supply of the clock signal or the supply power.

The control method of the use prohibition process of behavior MB will be described with reference to FIG. 11A.

The power management unit 62, in case of executing the use prohibition process, transmits the assignment prohibition request to the resource management unit 64, the assignment prohibition request prohibiting the new job assignment to the functional block 71. The resource management unit 64 configures the setting for not assigning the new job to the functional block 71, when the resource management unit 64 receives the assignment prohibition request from the power management unit 62. When the resource management unit 64 completes the setting, the resource management unit 64 transmits the setting change end notification to the power management unit 62.

Here, the functional block 71 cannot stop executing the job already assigned by the resource management unit 64 and then cannot cut off the access to the other functional blocks by itself, because the bus access control type of the functional block 71 is the bus master 2. Therefore, the power management unit 62 waits for the end of the use prohibition process until the execution of the job already assigned to the functional block 71 ends, when the power management unit 62 receives the setting change end notification from the resource management unit 64. Concretely, the power management unit 62 obtains the status of the use of the other functional blocks by the functional block 71 and then confirms whether the use of the other functional blocks by the functional block 71 ends or not. The use prohibition process of the behavior MB ends, when the power management unit 62 confirms that the use of the other functional blocks by the functional block 71 ends. In this way, it is possible to prevent the power control from being performed to the functional block 71 during the functional block 71 accessing the other functional blocks.

Next, the control method of the use permission process of behavior MB will be described with reference to FIG. 11B.

The power management unit 62, in case of executing the use permission process, transmits the assignment permission request to the resource management unit 64, the assignment permission request permitting the new job assignment to the functional block 71. The resource management unit 64 configures the setting for permitting to assign the new job to the functional block 71, when the resource management unit 64 receives the assignment permission request from the power management unit 62. When the resource management unit 64 completes the setting, the resource management unit 64 transmits the setting change end notification to the power management unit 62. In this way, the use permission process of the behavior MB ends.

Figure 12A:
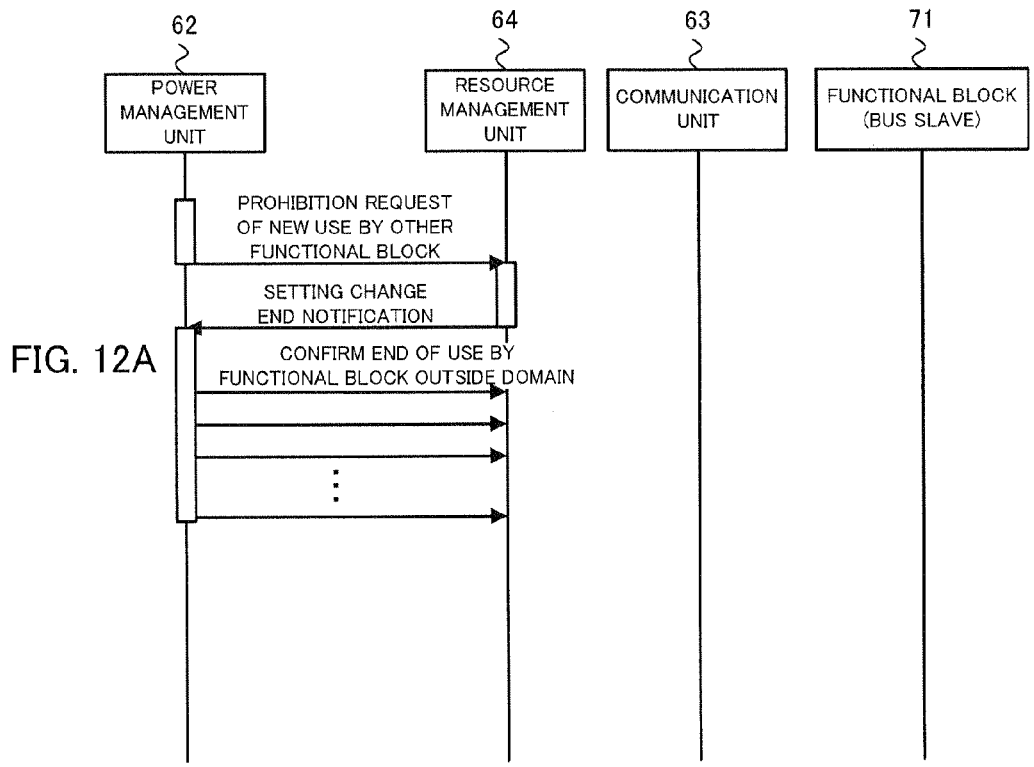
FIGS. 12A and 12B are sequence diagrams showing the control method in case that the behavior type is determined to the behavior S-T1.
Figure 12B:
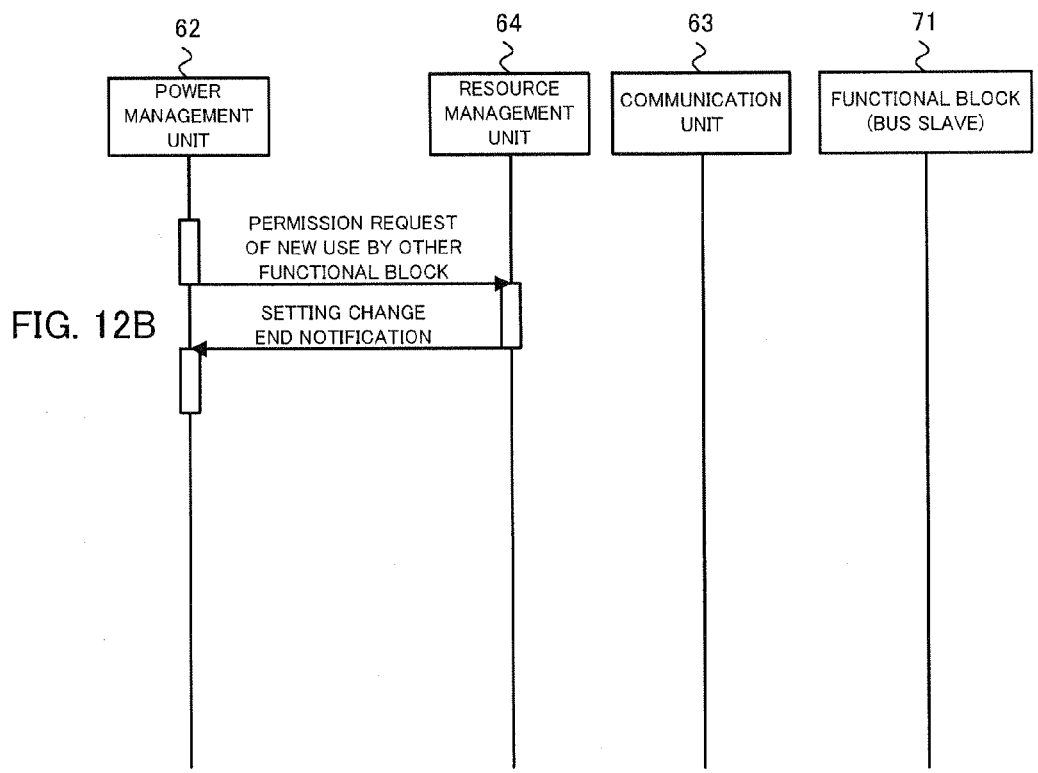

FIGS. 12A and 12B are the sequence diagrams showing the control method in case that the behavior type of the functional block is determined to the behavior S-T1. FIG. 12A is the sequence diagram showing the control method of the use prohibition process in the behavior S-T1, and FIG. 12B is the sequence diagram showing the control method of the use permission process in the behavior S-T1.

The behavior type of the functional block 71 is determined to the behavior S-T1 when the bus access control type of the functional block 71 is the bus slave and the state saving operation type is the type 1. Namely, it is when the power control content is the change of the clock signal or the supply voltage, or the stop (or the restart) of the supply of the clock signal.

The control method of the use prohibition process of behavior S-T1 will be described with reference to FIG. 12A.

The power management unit 62, in case of executing the use prohibition process, transmits the prohibition request to the resource management unit 64, the prohibition request prohibiting the new use of the functional block 71 by the other functional blocks. The resource management unit 64 configures the setting for prohibiting the new use of the functional block 71 by the other functional blocks, when the resource management unit 64 receives the prohibition request from the power management unit 62. When the resource management unit 64 completes the setting, the resource management unit 64 transmits the setting change end notification to the power management unit 62.

Here, the functional block 71 cannot cut off the access by the other functional blocks to which the use is already permitted by the resource management unit 64 because the bus access control type of the functional block 71 is the bus slave. Therefore, the power management unit 62 waits for the end of the use of the functional block 71 by the other functional blocks to which the use is already permitted by the resource management unit 64.

The power management unit 62 waits for the end of the use prohibition process until the use of the functional block 71 by the other functional blocks outside the power control object domain ends, when the power management unit 62 receives the setting change end notification from the resource management unit 64. Concretely, the power management unit 62 obtains the status of the use of the functional block 71 by the other functional blocks outside the power control object domain and then confirms whether the use of the functional block 71 by the other functional blocks ends or not. The use prohibition process of the behavior S-T1 ends, when the power management unit 62 confirms that the use of the functional block 71 by the other functional blocks outside the power control object domain ends. In this way, it is possible to prevent the power control from being performed to the functional block 71 during the other functional blocks accessing the functional block 71.

Here, the reason why the confirmation of the end of the use of the functional block 71 by the other functional blocks outside the power control object domain is executed and the confirmation of the end of the use of the functional block 71 by the other functional blocks in the power control object domain is not executed will be described below. Namely, when the bus master 1 or the bus master 2 in the power control object domain uses the functional block 71, the use prohibition process of the behavior MA-T1 or MB1 is executed to the bus master 1 or the bus master 2, respectively. In other words, the use of the functional block 71 by the bus master 1 or the bus master 2 in the power control object domain is ended by the use prohibition process of the behavior MA-T1 or MB1, before the power control request is transmitted to the power control device 51.

The control method of the use permission process of behavior S-T1 will be described with reference to FIG. 12B.

The power management unit 62, in case of executing the use permission process, transmits the permission request to the resource management unit 64, the permission request permitting the new use of the functional block 71 by the other functional blocks. The resource management unit 64 configures the setting for permitting the new use of the functional block 71 by the other functional blocks, when the resource management unit 64 receives the permission request from the power management unit 62. When the resource management unit 64 completes the setting, the resource management unit 64 transmits the setting change end notification to the power management unit 62. In this way, the use permission process of the behavior S-T1 ends.

Figure 13A:
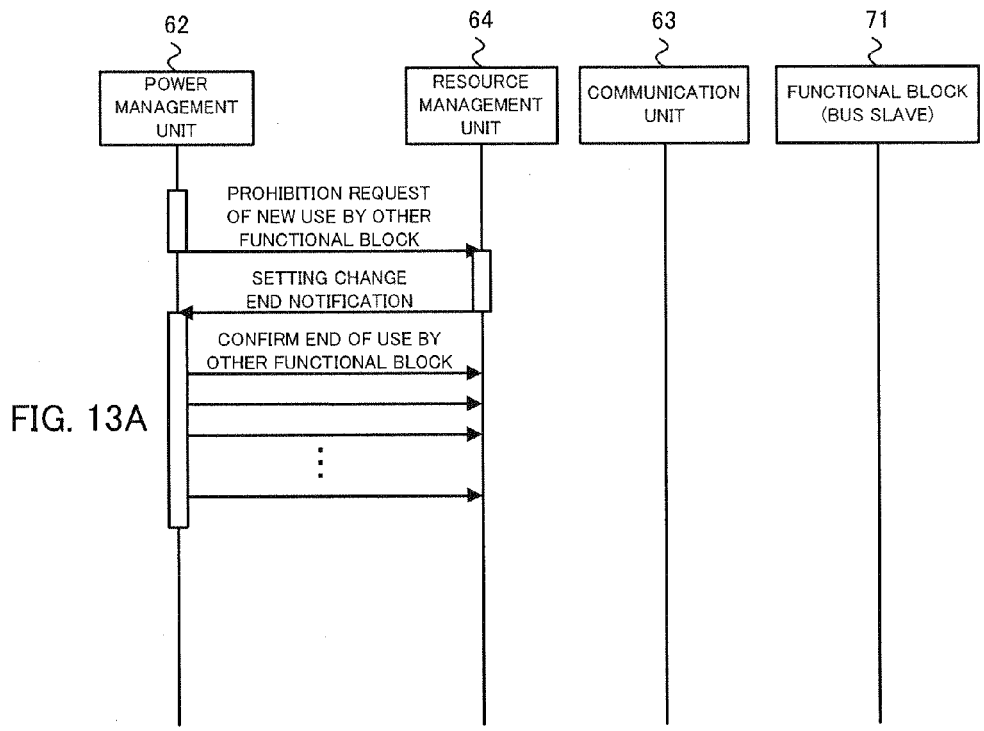
FIGS. 13A and 13B are sequence diagrams showing the control method in case that the behavior type is determined to the behavior S-T3.
Figure 13B:
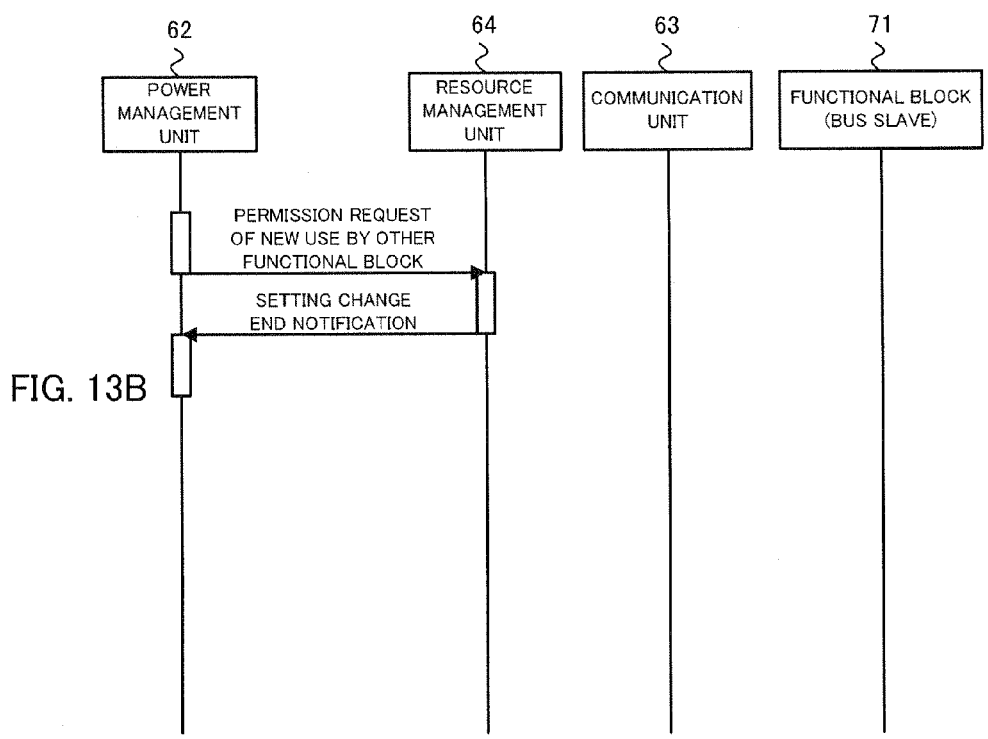

FIGS. 13A and 13B are the sequence diagrams showing the control method in case that the behavior type of the functional block is determined to the behavior S-T3. FIG. 13A is the sequence diagram showing the control method of the use prohibition process in the behavior S-T3, and FIG. 13B is the sequence diagram showing the control method of the use permission process in the behavior S-T3.

The behavior type of the functional block 71 is determined to the behavior S-T3 when the bus access control type of the functional block 71 is the bus slave and the state saving operation type is the type 3. Namely, it is when the power control content is the stop (or the restart) of the supply of the supply power.

The control method of the use prohibition process of behavior S-T3 will be described with reference to FIG. 13A.

The power management unit 62, in case of executing the use prohibition process, transmits the prohibition request to the resource management unit 64, the prohibition request prohibiting the new use of the functional block 71 by the other functional blocks. The resource management unit 64 configures the setting for prohibiting the new use of the functional block 71 by the other functional blocks, when the resource management unit 64 receives the prohibition request from the power management unit 62. When the resource management unit 64 completes the setting, the resource management unit 64 transmits the setting change end notification to the power management unit 62.

Here, the functional block 71 cannot cut off the access by the other functional blocks to which the use of the functional block 71 is already permitted by the resource management unit 64 because the bus access control type of the functional block 71 is the bus slave. Therefore, the power management unit 62 waits for the end of the use prohibition process until the use of the functional block 71 by the other functional blocks ends, when the power management unit 62 receives the setting change end notification from the resource management unit 64. Concretely, the power management unit 62 obtains the status of the use of the functional block 71 by the other functional blocks and then confirms whether the use of the functional block 71 by the other functional blocks ends or not. The use prohibition process of the behavior S-T3 is ended, when the power management unit 62 confirms that the use of the functional block 71 by the other functional blocks ends. In this way, it is possible to prevent the power control from being performed to the functional block 71 during the other functional blocks accessing the functional block 71.

The above-mentioned use prohibition process of the behavior S-T1 shows that "the power management unit 62 waits for the end of the use prohibition process until the use of the functional block 71 by the other functional blocks outside the power control object domain ends". In contrast, the above-mentioned use prohibition process of the behavior S-T3 shows that "the power management unit 62 waits for the end of the use prohibition process until the use of the functional block 71 by the other functional blocks ends". This reason will be described below.

As the detailed explanation will be given later, when the power control content is the stop of the supply of the supply power, after the power management unit 62 executes the use prohibition process with respect to all the bus slave functions of the functional blocks belonging to the power control object domain, the power management unit 62 executes the use prohibition process with respect to the bus master functions. Here, as described previously, the power management unit 62 waits for the end of the use prohibition process until the use of the functional block 71 by the other functional blocks including the functional blocks in the power control object domain ends, when the power management unit 62 executes the use prohibition process with respect to the bus slave functions. That is because the data stored in the functional block 71 is erased in the case of the stop of the supply power, unlike the case of the change of the clock signal or the supply voltage, or the stop of the supply of the clock signal. For details, this is not to leave the useful data for the bus master 1 in the functional block 71 before the data is erased, by ending the access to the functional block 71 by the bus master 1 in the power control object domain without cutting off the access.

Next, the control method of the use permission process of behavior S-T3 will be described with reference to FIG. 13B.

The power management unit 62, in case of executing the use permission process, transmits the permission request to the resource management unit 64, the permission request permitting the new use of the functional block 71 by the other functional blocks. The resource management unit 64 configures the setting for permitting the new use of the functional block 71 by the other functional blocks, when the resource management unit 64 receives the permission request from the power management unit 62. When the resource management unit 64 completes the setting, the resource management unit 64 transmits the setting change end notification to the power management unit 62. In this way, the use permission process of the behavior S-T3 ends.

Figure 14A:
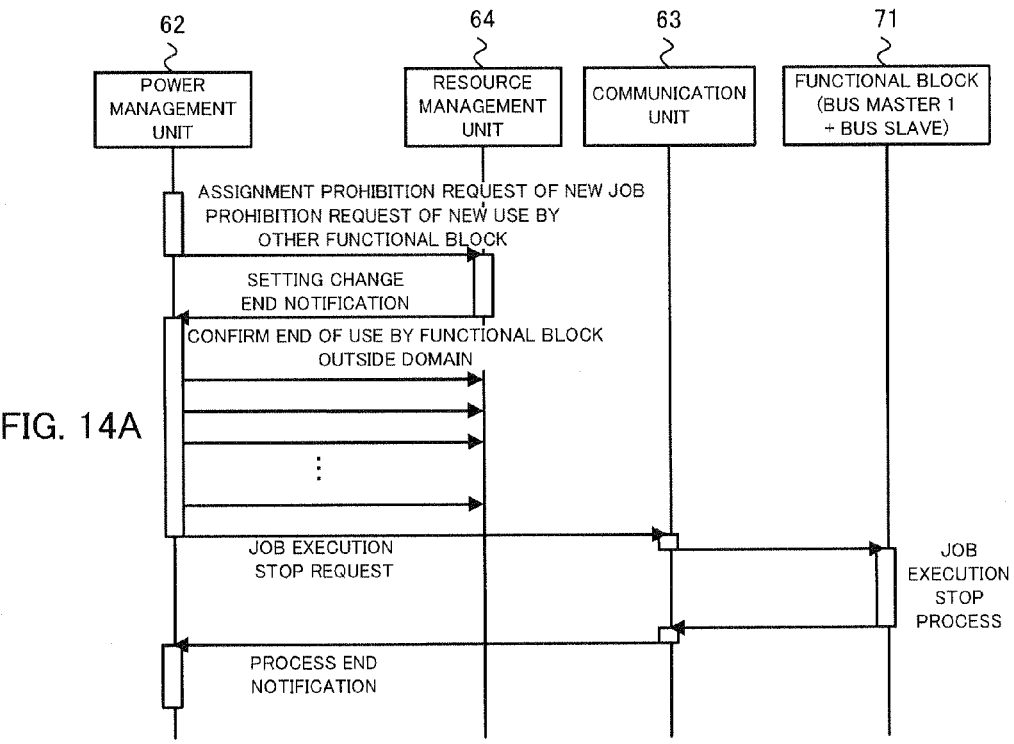
FIGS. 14A and 14B are sequence diagrams showing the control method in case that the behavior type is determined to the behavior MAS-T1.
Figure 14B:
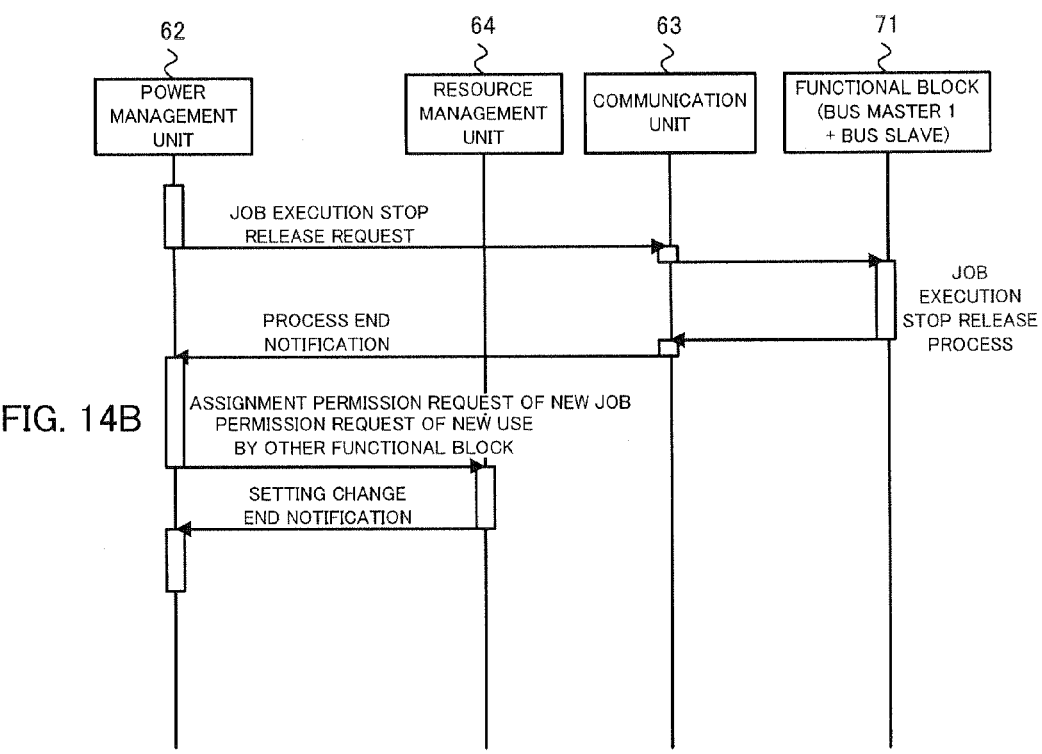

FIGS. 14A and 14B are the sequence diagrams showing the control method in case that the behavior type of the functional block is determined to the behavior MAS-T1. FIG. 14A is the sequence diagram showing the control method of the use prohibition process in the behavior MAS-T1, and FIG. 14B is the sequence diagram showing the control method of the use permission process in the behavior MAS-T1.

The behavior type of the functional block 71 is determined to the behavior MAS-T1 when the bus access control type of the functional block 71 is the bus master 1+the bus slave and the state saving operation type is the type 1. Namely, it is when the power control content is the change of the clock signal or the supply voltage, or the stop (or the restart) of the supply of the clock signal.

The control method of the use permission process of behavior MAS-T1 will be described with reference to FIG. 14A.

The power management unit 62, in case of executing the use prohibition process, transmits the prohibition request and the assignment prohibition request to the resource management unit 64, the prohibition request prohibiting the new use of the functional block 71 by the other functional blocks, the assignment prohibition request prohibiting the new job assignment to the functional block 71. The resource management unit 64 configures the setting for prohibiting the new use of the functional block 71 by the other functional blocks and not assigning the new job to the functional block 71, when the resource management unit 64 receives these prohibition requests from the power management unit 62. When the resource management unit 64 completes the setting, the resource management unit 64 transmits the setting change end notification to the power management unit 62.

Here, when the power management unit 62 receives the setting change end notification from the resource management unit 64, the power management unit 62 waits for the end of the use of the functional block 71 by the other functional blocks outside the power control object domain because the functional block 71 has the function of the bus slave. Concretely, the power management unit 62 obtains the status of the use of the functional block 71 by the other functional blocks outside the power control object domain and then confirms whether the use of the functional block 71 by the other functional blocks outside the domain ends or not. The use prohibition process to the bus slave function of the functional block 71 is completed, when the power management unit 62 confirms that the use of the functional block 71 by the other functional blocks outside the power control object domain ends.

In addition, the functional block 71 can stop executing the job already assigned by the resource management unit 64, by the control request from outside, because the functional block 71 has the function of the bus master 1. Therefore, the power management unit 62 transmits the job execution stop request to the functional block 71 via the communication unit 63, when the power management unit 62 confirms that the use of the functional block 71 by the other functional blocks outside the power control object domain ends. When the functional block 71 receives the job execution stop request from the power management unit 62, the functional block 71 executes the job execution stop process to stop executing the job already assigned by the resource management unit 64 and then cuts off the access to the other functional blocks. The functional block 71 transmits the process end notification to the power management unit 62 via the communication unit 63, when the job execution stop process ends. In this way, the use prohibition process to the function of the bus master 1 of the functional block 71 is completed and then the use prohibition process of the behavior MAS-T1 is completed.

Next, the control method of the use permission process of behavior MAS-T1 will be described with reference to FIG. 14B.

The power management unit 62, in case of executing the use permission process, transmits the job execution stop release request to the functional block 71 via the communication unit 63. When the functional block 71 receives the job execution stop release request from the power management unit 62, the functional block 71 executes the job execution stop release process to permit executing the job assigned by the resource management unit 64. The functional block 71 transmits the process end notification to the power management unit 62 via the communication unit 63, when the job execution stop release process ends.

When the power management unit 62 receives the process end notification from the functional block 71, the power management unit 62 transmits the assignment permission request and the permission request to the resource management unit 64, the assignment permission request permitting the new job assignment to the functional block 71, the permission request permitting the new use of the functional block 71 by the other functional blocks. The resource management unit 64 configures the setting for permitting to assign the new job to the functional block 71 and permitting the new use of the functional block 71 by the other functional blocks, when the resource management unit 64 receives these permission requests from the power management unit 62. When the resource management unit 64 completes the setting, the resource management unit 64 transmits the setting change end notification to the power management unit 62. In this way, the use permission process of the behavior MAS-T1 is completed.

Figure 15A:
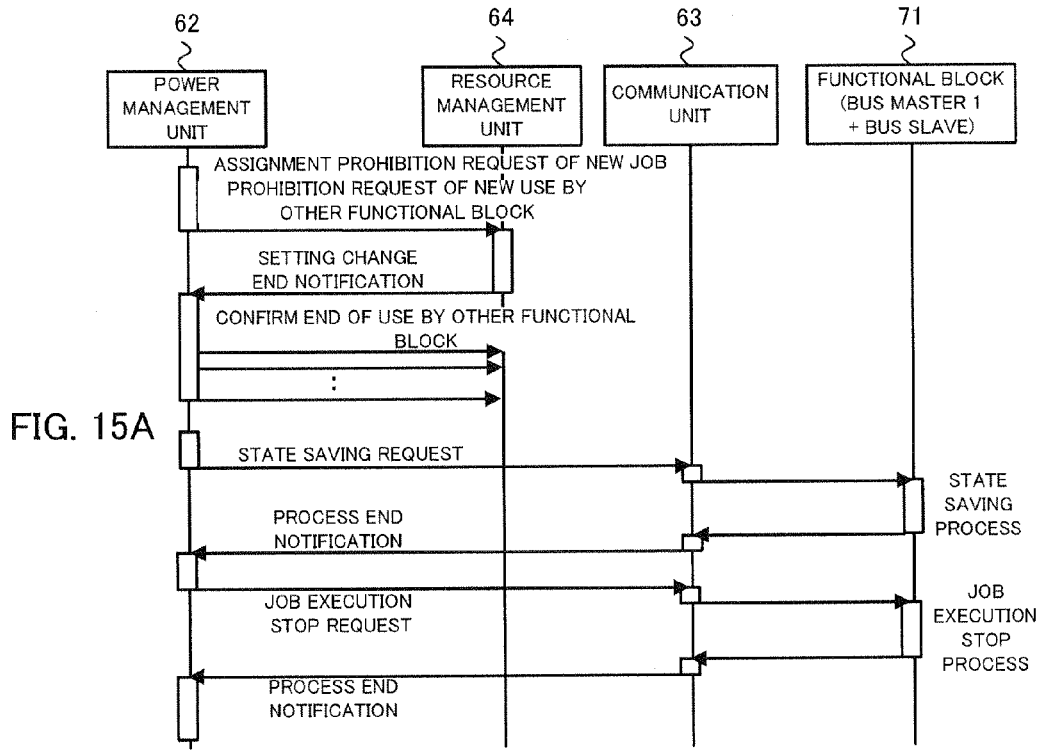
FIGS. 15A and 15B are sequence diagrams showing the control method in case that the behavior type is determined to the behavior MAS-T2.
Figure 15B:
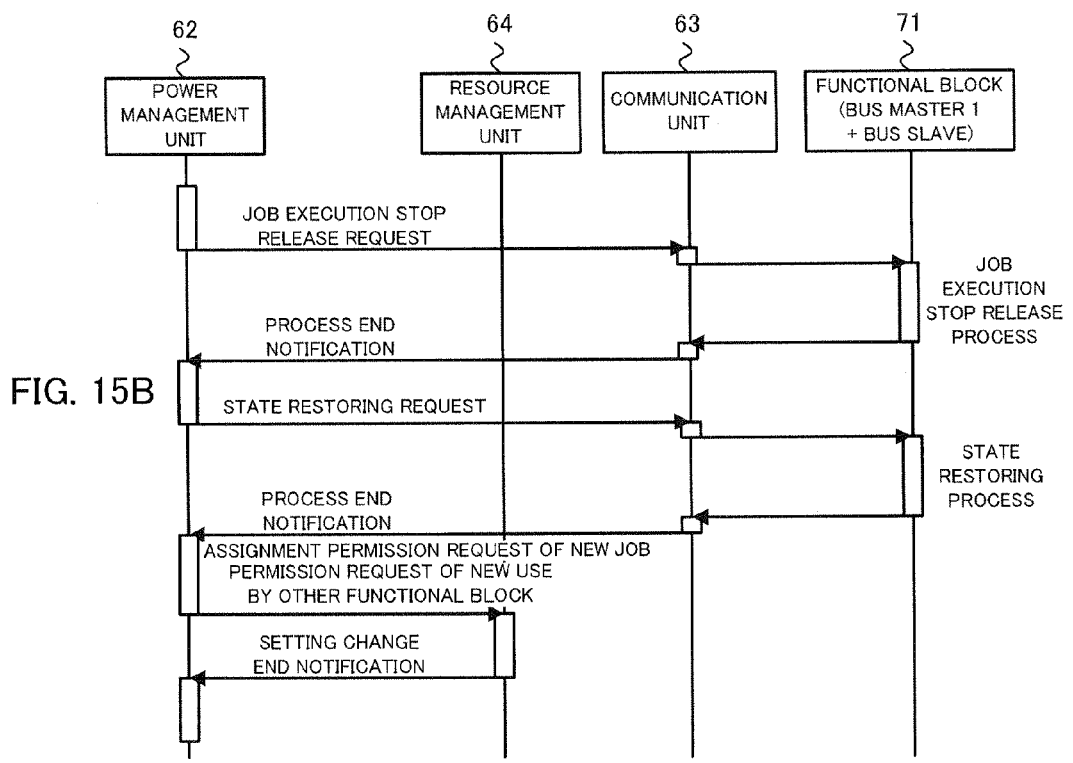

FIGS. 15A and 15B are the sequence diagrams showing the control method in case that the behavior type of the functional block is determined to the behavior MAS-T2. FIG. 15A is the sequence diagram showing the control method of the use prohibition process in the behavior MAS-T2, and FIG. 15B is the sequence diagram showing the control method of the use permission process in the behavior MAS-T2.

The behavior type of the functional block 71 is determined to the behavior MAS-T2 when the bus access control type of the functional block 71 is the bus master 1+the bus slave and the state saving operation type is the type 2. Namely, it is when the power control content is the stop (or the restart) of the supply of the supply power. In this case, the operation for the saving (or the restoring) of the state of the functional block 71 is performed.

The control method of the use prohibition process of behavior MAS-T2 will be described with reference to FIG. 15A.

The power management unit 62, in case of executing the use prohibition process, transmits the prohibition request and the assignment prohibition request to the resource management unit 64, the prohibition request prohibiting the new use of the functional block 71 by the other functional blocks, the assignment prohibition request prohibiting the new job assignment to the functional block 71. The resource management unit 64 configures the setting for prohibiting the new use of the functional block 71 by the other functional blocks and not assigning the new job to the functional block 71, when the resource management unit 64 receives these prohibition requests from the power management unit 62. When the resource management unit 64 completes the setting, the resource management unit 64 transmits the setting change end notification to the power management unit 62.

Here, when the power management unit 62 receives the setting change end notification from the resource management unit 64, the power management unit 62 waits for the end of the use of the functional block 71 by the other functional blocks because the functional block 71 has the function of the bus slave. Concretely, the power management unit 62 obtains the status of the use of the functional block 71 by the other functional blocks and then confirms whether the use of the functional block 71 by the other functional blocks ends or not. The use prohibition process to the bus slave function of the functional block 71 is completed, when the power management unit 62 confirms that the use of the functional block 71 by the other functional blocks ends.

In addition, the functional block 71 has the function of the bus master 1. Therefore, after the power management unit 62 executes the use prohibition process to the bus slave functions of all the functional blocks belonging to the power control object domain, the power management unit 62 transmits the state saving request saving the state of the functional block 71 to the functional block 71 via the communication unit 63. The functional block 71 executes the state saving process saving the stored data in the register of the functional block 71 to the nonvolatile memories when the functional block 71 receives the state saving request from the power management unit 62. In this way, the state of the functional block 71 is saved. The functional block 71 transmits the process end notification to the power management unit 62 via the communication unit 63, when the state saving process ends.

When the power management unit 62 receives the process end notification, as the response to the state saving request, from the functional block 71, the power management unit 62 transmits the job execution stop request requesting the stop of the execution of the job to the functional block 71 via the communication unit 63. When the functional block 71 receives the job execution stop request from the power management unit 62, the functional block 71 executes the job execution stop process to stop executing the job already assigned by the resource management unit 64. In this way, the access from the functional block 71 to the other functional blocks is cut off. The functional block 71 transmits the process end notification to the power management unit 62 via the communication unit 63, when the job execution stop process ends. In this way, the use prohibition process to the function of the bus master 1 of the functional block 71 is completed and the use prohibition process of the behavior MAS-T2 is completed.

Next, the control method of the use permission process of behavior MAS-T2 will be described with reference to FIG. 15B.

The power management unit 62, in case of executing the use permission process, transmits the job execution stop release request to the functional block 71 via the communication unit 63, the job execution stop release request releasing the stop of the execution of the job. When the functional block 71 receives the job execution stop release request from the power management unit 62, the functional block 71 executes the job execution stop release process to permit executing the job being assigned by the resource management unit 64. The functional block 71 transmits the process end notification to the power management unit 62 via the communication unit 63, when the job execution stop release process ends.

When the power management unit 62 receives the process end notification, as the response to the job execution stop release request, from the functional block 71, the power management unit 62 transmits the state restoring request restoring the state of the functional block 71 to the functional block 71 via the communication unit 63. The functional block 71 executes the state restoring process writing the stored data in the nonvolatile memories to the register of the functional block 71, when the functional block 71 receives the state restoring request from the power management unit 62. The functional block 71 transmits the process end notification to the power management unit 62 via the communication unit 63, when the state restoring process ends.

When the power management unit 62 receives the process end notification, as the response to the state restoring request, from the functional block 71, the power management unit 62 transmits the assignment permission request and the permission request to the resource management unit 64, the assignment permission request permitting the new job assignment to the functional block 71, the permission request permitting the new use of the functional block 71 by the other functional blocks. The resource management unit 64 configures the setting for permitting to assign the new job to the functional block 71 and permitting the new use of the functional block 71 by the other functional blocks, when the resource management unit 64 receives these permission requests from the power management unit 62. When the resource management unit 64 completes the setting, the resource management unit 64 transmits the setting change end notification to the power management unit 62. In this way, the use permission process of the behavior MAS-T2 is completed.

Figure 16A:
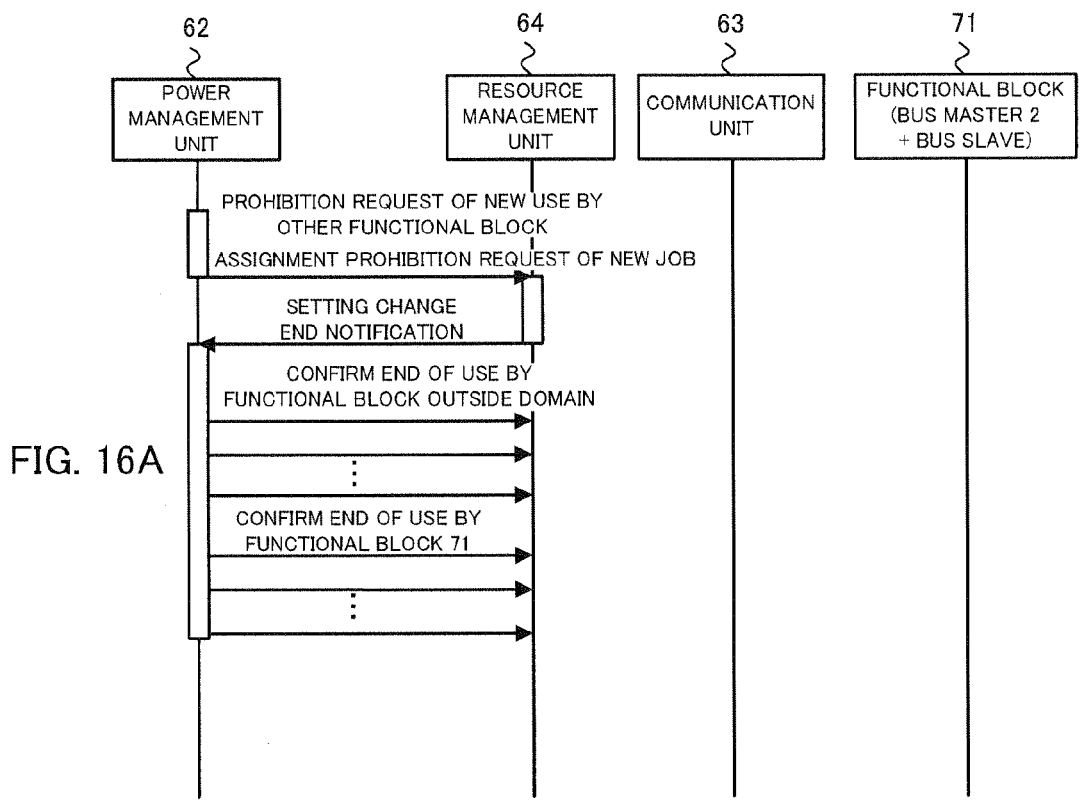
FIGS. 16A and 16B are sequence diagrams showing the control method in case that the behavior type is determined to the behavior MBS-T1.
Figure 16B:
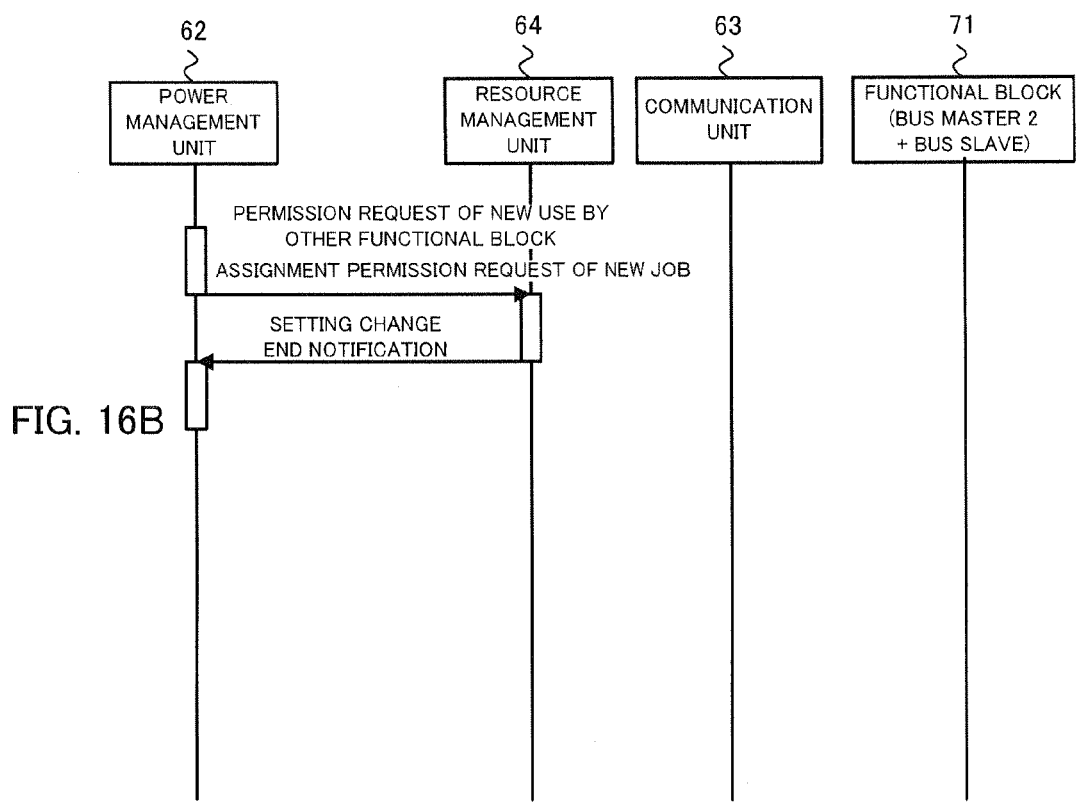

FIGS. 16A and 16B is the sequence diagram showing the control method in case that the behavior type of the functional block is determined to the behavior MBS-T1. FIG. 16A is the sequence diagram showing the control method of the use prohibition process in the behavior MBS-T1, and FIG. 16B is the sequence diagram showing the control method of the use permission process in the behavior MBS-T1.

The behavior type of the functional block 71 is determined to the behavior MBS-T1 when the bus access control type of the functional block 71 is the bus master 2+the bus slave and the state saving operation type is the type 1. Namely, it is when the power control content is the change of the clock signal or the supply voltage, or the stop (or the restart) of the supply of the clock signal.

The control method of the use prohibition process of behavior MBS-T1 will be described with reference to FIG. 16A.

The power management unit 62, in case of executing the use prohibition process, transmits the prohibition request and the assignment prohibition request to the resource management unit 64, the prohibition request prohibiting the new use of the functional block 71 by the other functional blocks, the assignment prohibition request prohibiting the new job assignment to the functional block 71. The resource management unit 64 configures the setting for prohibiting the new use of the functional block 71 by the other functional blocks and not assigning the new job to the functional block 71, when the resource management unit 64 receives these prohibition requests from the power management unit 62. When the resource management unit 64 completes the setting, the resource management unit 64 transmits the setting change end notification to the power management unit 62.

Here, when the power management unit 62 receives the setting change end notification from the resource management unit 64, the power management unit 62 waits for the end of the use of the functional block 71 by the other functional blocks outside the power control object domain because the functional block 71 has the function of the bus slave. Concretely, the power management unit 62 obtains the status of the use of the functional block 71 by the other functional blocks outside the power control object domain and then confirms whether the use of the functional block 71 by the other functional blocks outside the domain ends or not. The use prohibition process to the bus slave function of the functional block 71 is completed, when the power management unit 62 confirms that the use of the functional block 71 by the other functional blocks outside the power control object domain ends.

In addition, the functional block 71 has the function of the bus master 2. Therefore, after the power management unit 62 confirms that the use of the functional block 71 by the other functional blocks outside the power control object domain ends, the power management unit 62 waits for the end of the execution of the job already assigned. Concretely, the power management unit 62 obtains the status of the use of the other functional blocks by the functional block 71 and then confirms whether the use of the other functional blocks by the functional block 71 ends or not. The use prohibition process to the function of the bus master 2 of the functional block 71 is completed and then the use prohibition process of the behavior MBS-T1 is completed, when the power management unit 62 confirms that the use of the other functional blocks by the functional block 71 ends.

Next, the control method of the use permission process of behavior MBS-T1 will be described with reference to FIG. 16B.

The power management unit 62, in case of executing the use permission process, transmits the assignment permission request and the permission request to the resource management unit 64, the assignment permission request permitting the new job assignment to the functional block 71, the permission request permitting the new use of the functional block 71 by the other functional blocks. The resource management unit 64 configures the setting for permitting to assign the new job to the functional block 71 and permitting the new use of the functional block 71 by the other functional blocks, when the resource management unit 64 receives these permission requests from the power management unit 62. When the resource management unit 64 completes the setting, the resource management unit 64 transmits the setting change end notification to the power management unit 62. In this way, the use permission process of the behavior MBS-T1 is completed.

Figure 17A:
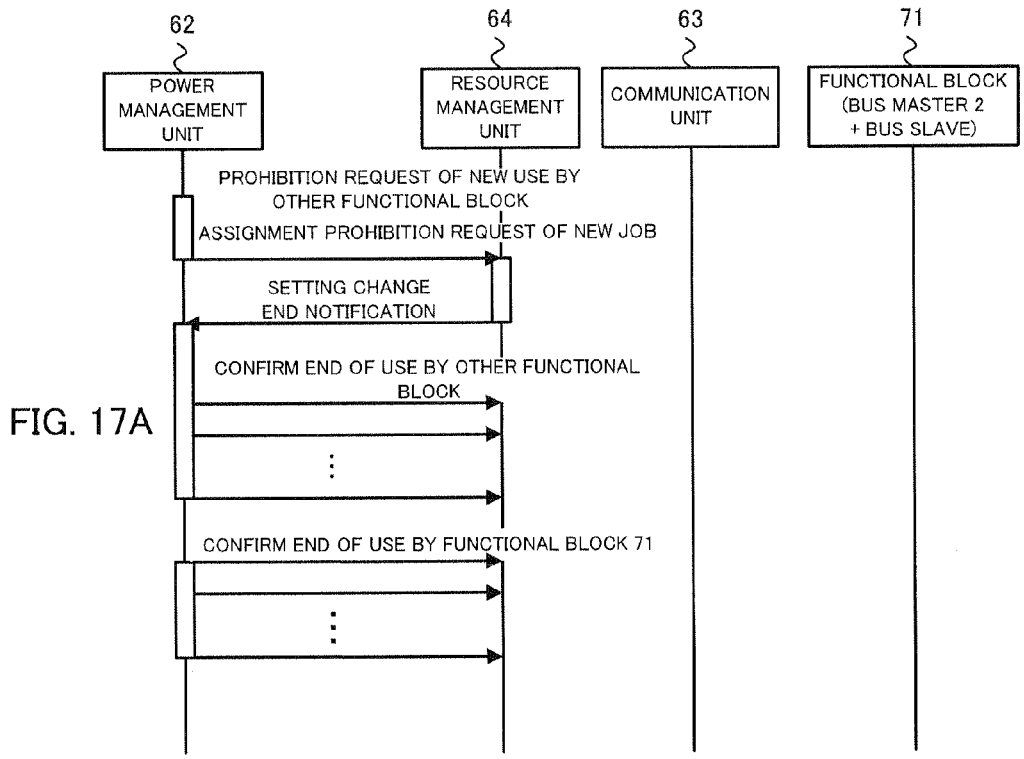
FIGS. 17A and 17B are sequence diagrams showing the control method in case that the behavior type is determined to the behavior MBS-T3.
Figure 17B:
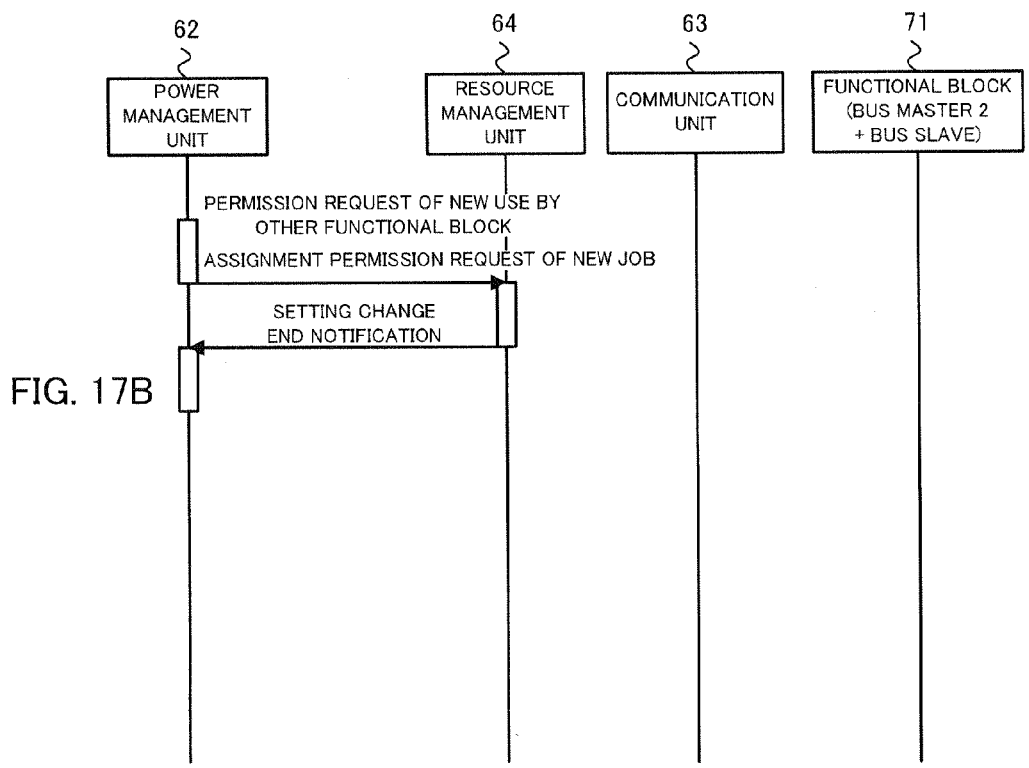

FIGS. 17A and 17B are the sequence diagrams showing the control method in case that the behavior type of the functional block is determined to the behavior MBS-T3. FIG. 17A is the sequence diagram showing the control method of the use prohibition process in the behavior MBS-T3, and FIG. 17B is the sequence diagram showing the control method of the use permission process in the behavior MBS-T3.

The behavior type of the functional block 71 is determined to the behavior MBS-T3 when the bus access control type of the functional block 71 is the bus master 2+the bus slave and the state saving operation type is the type 3. Namely, it is when the power control content is the stop (or the restart) of the supply of the supply power.

The control method of the use prohibition process of behavior MBS-T3 will be described with reference to FIG. 17A.

The power management unit 62, in case of executing the use prohibition process, transmits the prohibition request and the assignment prohibition request to the resource management unit 64, the prohibition request prohibiting the new use of the functional block 71 by the other functional blocks, the assignment prohibition request prohibiting the new job assignment to the functional block 71. The resource management unit 64 configures the setting for prohibiting the new use of the functional block 71 by the other functional blocks and not assigning the new job to the functional block 71, when the resource management unit 64 receives these prohibition requests from the power management unit 62. When the resource management unit 64 completes the setting, the resource management unit 64 transmits the setting change end notification to the power management unit 62.

Here, when the power management unit 62 receives the setting change end notification from the resource management unit 64, the power management unit 62 waits for the end of the use of the functional block 71 by the other functional blocks because the functional block 71 has the function of the bus slave. Concretely, the power management unit 62 obtains the status of the use of the functional block 71 by the other functional blocks and then confirms whether the use of the functional block 71 by the other functional blocks ends or not. The use prohibition process to the bus slave function of the functional block 71 is completed, when the power management unit 62 confirms that the use of the functional block 71 by the other functional blocks ends.

In addition, the functional block 71 has the function of the bus master 2. Therefore, after the power management unit 62 executes the use prohibition process to the bus slave functions of all the functional blocks belonging to the power control object domain, the power management unit 62 waits for the end of the execution of the job already assigned. Concretely, the power management unit 62 obtains the status of the use of the other functional blocks by the functional block 71 and then confirms whether the use of the other functional blocks by the functional block 71 ends or not. The use prohibition process to the function of the bus master 2 of the functional block 71 is completed and then the use prohibition process of the behavior MBS-T3 is completed, when the power management unit 62 confirms that the use of the other functional blocks by the functional block 71 ends.

Next, the control method of the use permission process of behavior MBS-T3 will be described with reference to FIG. 17B.

The power management unit 62, in case of executing the use permission process, transmits the assignment permission request and the permission request to the resource management unit 64, the assignment permission request permitting the new job assignment to the functional block 71, the permission request permitting the new use of the functional block 71 by the other functional blocks. The resource management unit 64 configures the setting for permitting to assign the new job to the functional block 71 and permitting the new use of the functional block 71 by the other functional blocks, when the resource management unit 64 receives these permission requests from the power management unit 62. When the resource management unit 64 completes the setting, the resource management unit 64 transmits the setting change end notification to the power management unit 62. In this way, the use permission process of the behavior MBS-T3 is completed.

Figure 18:
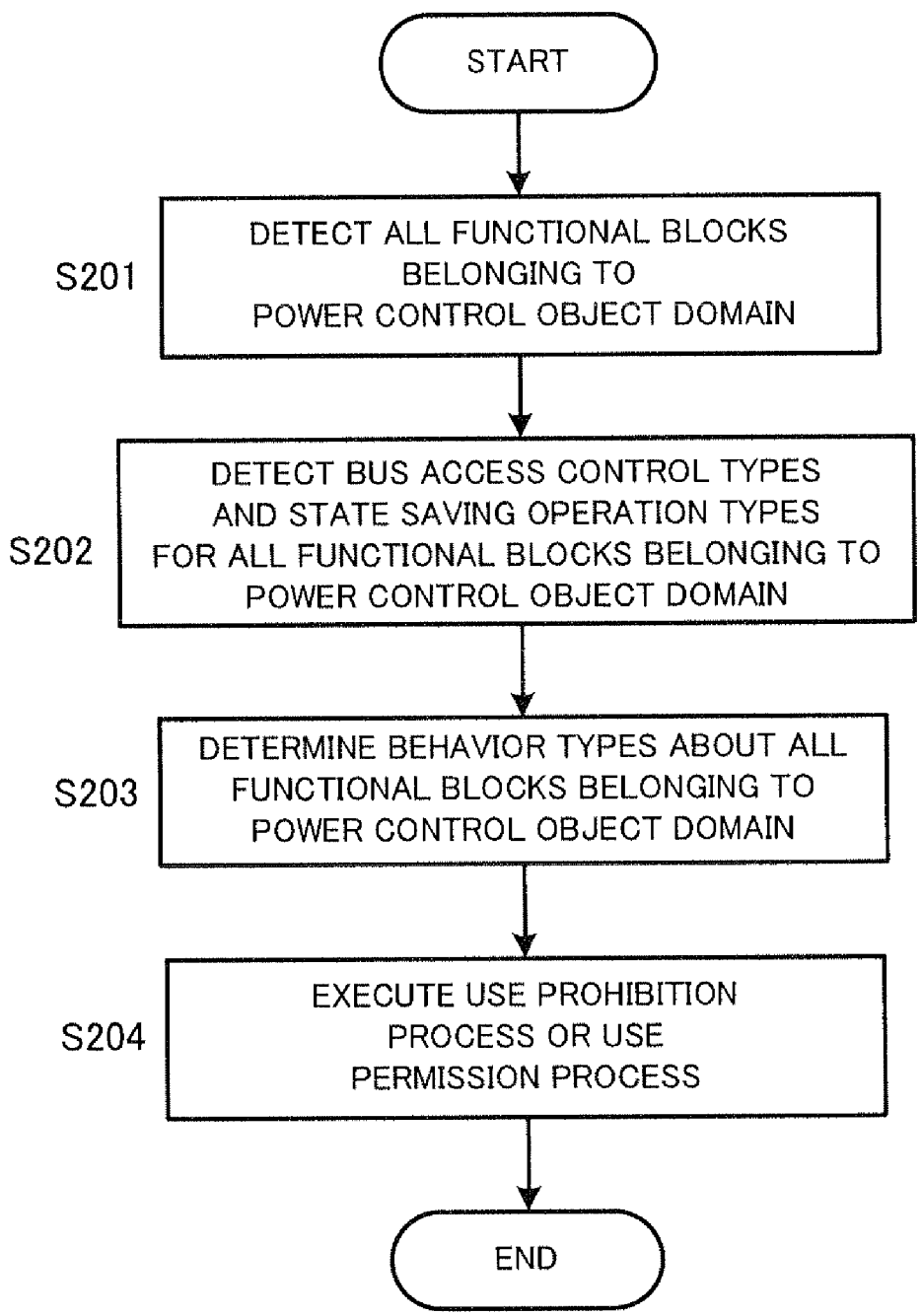
FIG. 18 is a flow chart showing the use permission process and the use prohibition process.

Next, the use permission process and the use prohibition process according to the embodiment will be described by using a flow chart of FIG. 18. FIG. 18 is the flow chart which shows the flows of the use permission process and the use prohibition process according to the embodiment. It will be described below the case that the power control content is the change of the clock signal or the supply voltage and the power control object domain is the domain 1.

First, the power management unit 62 detects the functional blocks belonging to the power control object domain in step S201, in case of executing the use prohibition process and the use permission process described in the flow chart of FIG. 5. For example, when the power control object domain is the domain 1, the functional blocks detected are the CPU 11, the memory 22, and the DSP 33 (see. FIG. 2).

In step S202, the power management unit 62 obtains the bus access control types and the state saving operation types of the functional blocks belonging to the power control object domain (see. FIG. 6). In the example described previously, the bus access control type of the CPU 11 is the bus master 1, the bus access control type of the memory 22 is the bus slave and the bus access control type of the DSP 33 is the bus master 2. In addition, the state saving operation type of any of the CPU 11, the memory 22 and the DSP 33 is the type 1 because the power control content is the change of the clock signal or the supply voltage.

In step S203, based on the bus access control types and the state saving operation types of the functional blocks belonging to the power control object domain, the power management unit 62 determines the behavior types of the functional blocks (see. FIG. 8). In the example described previously, the behavior type of the CPU 11 is determined to the behavior MA-T1, the behavior type of the memory 22 is determined to the behavior S-T1 and the behavior type of the DSP 33 is determined to the behavior MB.

In step S204, the power management unit 62 executes the use prohibition process or the use permission process in the behavior types determined in step S203. In the example described previously, in case of executing the use prohibition process, the power management unit 62 executes the use prohibition processes to the CPU 11, the memory 22 and the DSP 33 according to the control method of the use prohibition process in each of the behaviors MA-T1, S-T1 and MB. In this way, it is possible to put the functional blocks belonging to the domain 1 to the power-controllable state. In addition, in case of executing the use permission process, the power management unit 62 executes the use permission processes to the CPU 11, the memory 22 and the DSP 33 according to the control method of the use permission process in each of the behaviors MA-T1, S-T1 and MB. When the power management unit 62 ends the use prohibition process or the use permission process to the functional blocks belonging to the power control object domain, the power management unit 62 ends the process.

As described previously, when the power control content is the stop of the supply of the supply power, the power management unit 62 executes the use prohibition processes to the bus master functions after executing the use prohibition processes to the bus slave functions of all the functional blocks belonging to the power control object domain. For example, when the power control content is the stop of the supply of the supply power and the power control object domain is the domain 1, the behavior type of the CPU 11 is determined to the behavior MA-T2, the behavior type of the memory 22 is determined to the behavior S-T3 and the behavior type of the DSP 33 is determined to the behavior MB in step S203. Therefore, in this case, in step S204, the power management unit 62 executes the use prohibition process to the memory 22 according to the control method of the use prohibition process in the behavior S-T3. After that, the power management unit 62 executes the use prohibition processes to the CPU 11 and the DSP 33 according to the control method of the use prohibition process in the behavior MA-T2 and MB. In this way, it is possible to prevent the supply of the supply power from being stopped, with leaving the useful data for the CPU 11, serving as the bus master 1 of the domain 1, in the memory 22.

In the above-described embodiment, the functional blocks include the CPU, the DSP, the memory, the DMAC and the ACC. However, the functional blocks, to which the method described in the above-mentioned embodiment are applied, are not limited to these. In addition, the grouping of domains in the integrated circuit is not limited to the grouping described in the above-mentioned embodiment.

The embodiment is not limited to the example of the above-described embodiment, and various changes may be made, if desired, without departing from the essence or spirit of the invention which can be read from the claims and the entire specification.

All examples and conditional language recited herein are intended for pedagogical purposes to aid the reader in understanding the invention and the concepts contributed by the inventor to furthering the art, and are to be constructed as being without limitation to such specifically recited examples and conditions, nor does the organization of such examples in the specification relate to a showing of the superiority and inferiority of the invention. Although the embodiments of present inventions have been described in detail, it should be understood that the various changes, substitutions, and alterations could be made hereto without departing from the spirit and scope of the invention.

In addition, according to the embodiment described above, the following supplementary note will be disclosed.

(Note 1) A power management circuit comprising:

a resource management unit which performs a use management of a functional block in an integrated circuit; and a power management unit which transmits a power control request to a power control device which controls power of the functional block for each domain, the power control request designating the domain to which at least one functional block belongs and a power control content for the domain;

wherein the power management unit executes a use prohibition process prohibiting a use of the functional block belonging to the domain by using the resource management unit, before transmitting the power control request to the power control device, in accordance with a type of the functional block belonging to the domain and the power control content.

(Note 2) The power management circuit according to note 1, wherein the power management unit prohibits by using the resource management unit, as the use prohibition process, an assignment of a new job to the functional block when the functional block belonging to the domain has a function of a bus master.

(Note 3) The power management circuit according to note 2, wherein the power management unit transmits, as the use prohibition process, a stop request of the execution of the job already assigned, to the functional block, when the functional block belonging to the domain has the function of the bus master which is able to stop the execution of the job already assigned.

(Note 4) The power management circuit according to note 3, wherein the power management unit transmits, as the use prohibition process, a saving request of the state of the functional block to the functional block, when the functional block belonging to the domain has the function of the bus master which is able to execute a saving of the state of the functional block by a request from outside and the power control content is a stop of the supply of the supply power to the domain.

(Note 5) The power management circuit according to note 2, wherein the power management unit waits for an end of the use prohibition process until an execution of the job already assigned ends, when the functional block belonging to the domain has the function of the bus master which is not able to stop the execution of the job already assigned.

(Note 6) The power management circuit according to note 1, wherein the power management unit prohibits, as the use prohibition process, a new use of the functional block by the other functional block, by using the resource management unit, when the functional block belonging to the domain has a function of a bus slave.

(Note 7) The power management circuit according to note 6, wherein the power management unit waits for an end of the use prohibition process, as the use prohibition process, until the use by the other functional block to which the use of the functional block is already permitted ends.

(Note 8) The power management circuit according to note 1, wherein the power management unit executes the use prohibition process, and executes the use permission process permitting the use of the functional block belonging to the domain by using the resource management unit in case that the power control to the domain ends, when the power control content is a change of a frequency of clock signal or a change of a voltage of supply power.

(Note 9) A power management method comprising:
a process which obtains a power control request designating a domain to which at least one functional block in the integrated circuit belongs and a power control content for the domain;
a process which executes a use prohibition process prohibiting a use of the functional block belonging to the domain, in accordance with a type of the functional block belonging to the domain and the power control content; and
a process which transmits the power control request to a power control device which controls power of the functional block for each domain after an execution of the use prohibition process ends.

(Note 10) A power management program product in computer-readable medium executed by a computer, making the computer function as:
a resource management unit which performs a use management of a functional block in an integrated circuit; and
a power management unit which transmits a power control request to a power control device which controls power of the functional block for each domain, the power control request designating the domain to which at least one functional block belongs and a power control content for the domain;
wherein the power management unit executes a use prohibition process prohibiting a use of the functional block belonging to the domain, by using the resource management unit, before transmitting the power control request to the power control device, in accordance with a type of the functional block belonging to the domain and the power control content.

What is claimed is:

1. A power management circuit, comprising:
a resource management unit which performs a use management of a functional block in an integrated circuit; and
a power management unit which transmits a power control request to a power . control device which controls power of the functional block for each domain, the power control request designating the domain to which at least one functional block belongs and a power control content for the domain;
wherein the power management unit executes a use prohibition process prohibiting a use of the functional block belonging to the domain by using the resource management unit, before transmitting the power control request to the power control device, in accordance with a type of the functional block belonging to the domain and the power control content, and
wherein the power management unit prohibits by using the resource management unit, as the use prohibition process, an assignment of a new job to the functional block when the functional block belonging to the domain has a function of a bus master.

2. The power management circuit according to claim 1, wherein the power management unit transmits, as the use prohibition process, a stop request of the execution of the job already assigned, to the functional block, when the functional block belonging to the domain has the function of the bus master which is able to stop the execution of the job already assigned.

3. The power management circuit according to claim 1, wherein the power management unit waits for an end of the use prohibition process until an execution of the job already assigned ends, when the functional block belonging to the domain has the function of the bus master which is not able to stop the execution of the job already assigned.

4. The power management circuit according to claim 1, wherein the power management unit prohibits, as the use prohibition process, a new use of the functional block by the other functional block, by using the resource management unit, when the functional block belonging to the domain has a function of a bus slave.

5. The power management circuit according to claim 1, wherein the power management unit executes the use prohibition process, and executes the use permission process permitting the use of the functional block belonging to the domain by using the resource management unit in case that the power control to the domain ends, when the power control content is a change of a frequency of clock signal or a change of a voltage of supply power.

6. The power management circuit according to claim 2, wherein the power management unit transmits, as the use prohibition process, a saving request of the state of the functional block to the functional block, when the functional block belonging to the domain has the function of the bus master which is able to execute a saving of the state of the functional block by a request from outside and the power control content is a stop of the supply of the supply power to the domain.

7. The power management circuit according to claim 4, wherein the power management unit waits for an end of the use prohibition process, as the use prohibition process, until the use by the other functional block to which the use of the functional block is already permitted ends.

8. A power management method, comprising:
a process which obtains a power control request designating a domain to which at least one functional block in the integrated circuit belongs and a power control content for the domain;
a process which executes a use prohibition process prohibiting a use of the functional block belonging to the domain, in accordance with a type of the functional block belonging to the domain and the power control content; and
a process which transmits the power control request to a power control device which controls power of the functional block for each domain after an execution of the use prohibition process ends,
wherein the use prohibition process prohibits an assignment of a new job to the functional block when the functional block belonging to the domain has a function of a bus master.

9. A power management program product in computer-readable medium executed by a computer, making the computer function as:

a resource management unit which performs a use management of a functional block in an integrated circuit; and a power management unit which transmits a power control request to a power control device which controls power of the functional block for each domain, the power control request designating the domain to which at least one functional block belongs and a power control content for the domain;

wherein the power management unit executes a use prohibition process prohibiting a use of the functional block belonging to the domain, by using the resource management unit, before transmitting the power control request to the power control device, in accordance with a type of the functional block belonging to the domain and the power control content, and wherein the power management unit prohibits by using the resource management unit, as the use prohibition process, an assignment of a new job to the functional block when the functional block belonging to the domain has a function of a bus master.

10. A power management program product in computer-readable medium executed by a computer, making the computer function as:

a resource management unit which performs a use management of a functional block in an integrated circuit; and a power management unit which transmits a power control request to a power control device which controls power of the functional block for each domain, the power control request designating the domain to which at least one functional block belongs and a power control content for the domain;

wherein the power management unit executes a use prohibition process prohibiting a use of the functional block belonging to the domain, by using the resource management unit, before transmitting the power control request to the power control device, in accordance with a type of the functional block belonging to the domain and the power control content, and wherein the power management unit prohibits, as the use prohibition process, a new use of the functional block by the other functional block, by using the resource management unit, when the functional block belonging to the domain has a function of a bus slave.

11. A power management program product in computer-readable medium executed by a computer, making the computer function as:

a resource management unit which performs a use management of a functional block in an integrated circuit; and a power management unit which transmits a power control request to a power control device which controls power of the functional block for each domain, the power control request designating the domain to which at least one functional block belongs and a power control content for the domain;

wherein the power management unit executes a use prohibition process prohibiting a use of the functional block belonging to the domain, by using the resource management unit, before transmitting the power control request to the power control device, in accordance with a type of the functional block belonging to the domain and the power control content, and wherein the power management unit executes the use prohibition process, and executes the use permission process permitting the use of the functional block belonging to the domain by using the resource management unit in case that the power control to the domain ends, when the power control content is a change of a frequency of clock signal or a change of a voltage of supply power.

* * * * *

(12) SUPPLEMENTAL EXAMINATION CERTIFICATE

United States Patent
Suzuki et al.

(10) Number: 8,407,507 F1
(45) Certificate Issued: Mar. 19, 2015

Control No.: 96/000,084
Primary Examiner: Jason Proctor

Filing Date: Feb. 13, 2015

No substantial new question of patentability is raised in the request for supplemental examination. See the Reasons for Substantial New Question of Patentability Determination in the file of this proceeding.

(56) Items of Information

FOREIGN PATENT DOCUMENTS

| | | |
|---|---|---|
| JP | 08-006681-A | 1/1996 |
| JP | 11-288334-A | 10/1999 |
| JP | 2006-072991-A | 3/2006 |
| JP | 2002-132397-A | 5/2002 |
| JP | 2006-004339-A | 1/2006 |